United States Patent [19]

Kojima et al.

[11] Patent Number: 4,951,125

[45] Date of Patent: Aug. 21, 1990

[54] IMAGE PICKUP APPARATUS

[75] Inventors: Ichiro Kojima, Amagasaki; Atsushi Morimura, Nara, both of Japan

[73] Assignee: Matsushita Electric Industrial Co., Ltd., Kadoma, Japan

[21] Appl. No.: 336,490

[22] Filed: Apr. 12, 1989

[30] Foreign Application Priority Data

| Apr. 12, 1988 | [JP] | Japan | 63-89827 |
| Jul. 22, 1988 | [JP] | Japan | 63-184320 |
| Nov. 16, 1988 | [JP] | Japan | 63-289297 |

[51] Int. Cl.$^5$ .............................................. H04N 5/14
[52] U.S. Cl. .................................. 358/22; 358/160; 358/180
[58] Field of Search ............... 358/21 R, 22, 160, 166, 358/180, 185, 209, 213.11, 213.37, 227

[56] References Cited

U.S. PATENT DOCUMENTS

| 3,935,381 | 1/1976 | Petrocelli et al. | 358/22 |
| 4,002,824 | 1/1977 | Petrocelli et al. | 358/180 |
| 4,641,183 | 2/1987 | Kinoshita | 358/44 |
| 4,757,384 | 7/1988 | Nonweiler | 358/22 |

FOREIGN PATENT DOCUMENTS

| 53-97328 | 8/1978 | Japan . |
| 58-207776 | 12/1983 | Japan . |
| 61-121068 | 7/1986 | Japan . |
| 61-232781 | 10/1986 | Japan . |
| 62-59473 | 3/1987 | Japan . |
| 62-132489 | 6/1987 | Japan . |
| 62-291269 | 12/1987 | Japan . |
| 63-86975 | 4/1988 | Japan . |
| 63-185284 | 7/1988 | Japan . |
| 63-185285 | 7/1988 | Japan . |
| 63-185286 | 7/1988 | Japan . |

Primary Examiner—Tommy P. Chin
Attorney, Agent, or Firm—Cushman, Darby & Cushman

[57] ABSTRACT

An image pickup apparatus has only a few line memories (5, 6, 7), a change-over switch (4, 104) for selectively supplying input signals to the line memories and a selector (8, 108) for selectively taking data stored in the line memories and stores data of a desired part of the picture to be enlarged or reformed in accordance with a predetermined procedure, and interpolation of the stored data of the scanning lines is sequentially performed, thereby enlarging or reforming the desired part of the picture without lowering quality of the image.

9 Claims, 25 Drawing Sheets

IMAGE PICKUP APPARATUS

FIELD OF THE INVENTION AND RELATED ART STATEMENT

1. Field of the Invention

The present invention relates to an image pickup apparatus such as a video camera and to a process, for instance to enlarge or reform, images taken by the image pickup apparatus.

2. Descripton of the Related Art

In the conventional image pickup apparatus such as disclosed in the U.S. Pat. No. 4,002,824, a frequency of a clock for driving an image pickup element is lowered in response to magnifications of enlargement, thereby to read video signals, and these signals are interpolated by use of delay lines.

Referring now to FIG. 19 which is the generalized block diagram, there is shown a select zoom camera 310 that includes a solid state sensor 312 which may be of the charged coupled device type providing a video output to a display generator 314 when scanned by variable scan generator 316. Variable scan generator 316 produces the clock pulses to control the scanning of the solid state sensor 312. The resultant video signal from the sensor 312 is controlled by the display generator 314 so that the output display will be a combined magnified subject area and its normal surroundings in a single TV picture.

The variable scan generator 316 of FIG. 19 consists of a horizontal scan generator 318 and a vertical scan generator 320. The outputs of these two generators are combined in an AND gate 322 to produce the variable scan for the solid state sensor of FIG. 19.

As shown in FIG. 21, a horizontal scan generator 18 comprises an active horizontal scan control 324, a horizontal gate 326, a multi-frequency generator 328 and a logic circuit 330.

The active horizontal scan generator 324 determines the time at which the clock pulses are allowed to start to scan the sensor 312. In the example waveforms shown the active scan control allows the horizontal scan to start three resolution bit time earlier than the normal horizontal scan. The horizontal gate 326 determines the horizontal area where the subject image is to be magnified. In the example shown by the waveforms, for a 2:1 magnification, the horizontal scan rate during first half of this gate is at one-half of the normal scan rate. After the first half of the gate, normal scan rate is resumed. The examples of normal horizontal scan and variable scan pulses into waveforms shown are with respect to the line blanking signal.

FIG. 22 shows the vertical scan generator and comprises an active vertical scan control 332, a vertical gate generator 334, a line sync, generator 336, divide by an N counter 338 and a logic circuit 340. The active vertical scan control 332 determines how far in advance the vertical scan is required to start. In the example waveforms shown the vertical scan control allows the vertical scan to start three lines earlier than the normal vertical scan. The vertical gate determines the vertical position in which the subject picture is to be magnified. During the first half of the gate scan rate was one-half the normal scan rate for a 1:2 magnification. The scan rate will be one-third the normal scan rate of a 1:3 magnification. These different scan rates are supplied from the multi-scan gate generator comprises of the line sync. generator 336 and divided by the N counter 338. The counter 338 counts downs from the normal scan rate. A logic circuit 340 selectively combines the normal and variable line rates to produce the vertical scan which is combined with the horizontal scan and thus the select zoom variable scan is generated.

FIG. 23 shows the display generator in block diagram form. The signal from the solid state sensor is fed to an analog to a digital converter 342 for converting the analog video into digital video signal. The output of analog to the digital converter 342 is fed to a horizontal display generator 344. The output from the horizontal display generator 344 is fed to a vertical display generator 346 which provides both horizontally and vertically corrected video output that is fed to digital to an analog converter 348.

Referring now to FIG. 24 which shows the horizontal display generator in more detail, the digital video signals from analog to the digital converter 342 are fed directly to a logic circuit 350 and through a first delay circuit 352 and through a second delay circuit 354. A delay circuit 354 consisits of three delay lines 356, 358 and 360. The output from the delay circuit 354 goes from 0 delay to $3\tau$ delay means of a sequence sampling switch 362. The delay $\tau$ in the delay line 352 is one-half a horizontal gate width so that the number of lines in the delay circuit 354 equals one-half of the vertical gate width. The output from the horizontal corrected video out of the logic circuit 350 is fed directly to the logic circuit 362 (FIG. 25) and though horizontal delay circuits 364 and 366. Logic circuits 350 and 362 are controlled by the horizontal and vertical gates and center position signals respectively from the vertical gate generator 334 (FIG. 22). The delay circuits 354 and 366 consist of a number of a plurality of delay elements which should equal one-half the vertical gate width. In the example shown there are three delay elements.

In the conventional image pickup apparatus as constructed above, clock pulses corresponding to enlarging magnification are generated in the variable scan generator 316, and reading of signal from the solid state sensor 312 is thereby controlled to execute or stop. When signal is taken from the sensor 312, the display generator 314 generates the signal, and when signal is not taken therefrom, the display generator 314 issues a signal which is delayed by the delay line.

However, in the above-mentioned construction, interpolation between neighboring two picture elements is performed by successively issuing the previous one (or several) signal(s) of picture element or the previous one (or several) signal(s) of line(s). Therefore, the quality of the enlarged picture is deteriorated like a mosaic state. Besides, horizontal transferring of the sensor, which is generally executed with very high speed, is not easily controlled to execute or stop at every time period of the picture element. It may result in deterioration of quality of the image by the reason such as imperfect transferring of data of the CCD.

OBJECT AND SUMMARY OF THE INVENTION

The object of the present invention is to offer an image pickup apparatus which can enlarge or reform the image without declining quality of the image through optimum memory means.

In order to achieve the above-mentioned object, the image pickup apparatus in accordance with the present invention comprises:

a solid-state image pickup element;

a drive circuit which controls to execute and stop vertical scanning of the image pickup element in response to a control signal C1;

n pieces of line memories (M1–Mn) for storing data of scanning lines;

change-over means for selectively giving an output signal S0 of the image pickup element to the line memories in response to a control signal C2;

a selector for selecting output signals of m pieces of the line memories in response to a control signal C3;

at least one multiplier for multiplying output signals S1–Sm of the selector by weight signals W1–Wm, respectively;

an adder for adding output signals of the multiplier each other; and a control signal generating circuit which issues the control signals C1, C2, C3 and W1–Wm and controls the change-over means to execute vertical transferring of the image pickup element, thereby to supply a new line's signal SON ans write the new lines's signal SON to a line memory Mx selected from among the line memories M1–Mn, wherein signal stored in the line memory Mx is the oldest one among signals stored in the line memories M1–Mn; wherein n,m and x hold the relations:

$$n \geq 3,$$
$$2 \leq m < n,$$
$$1 \leq x \leq n,$$

wherein n, m and x are integers.

The above-mentioned image pickup apparatus realized special functions such as enlargement or reform of the picture by using only several line memories without lowering quality of the image.

While the novel features of the invention are set forth particularly in the appended claims, the invention, both as to organization ad content, will be better understood and appreciated, along with other objects and features thereof, from the following detailed description taken in conjunction with the drawings.

BRIEF DESCRIPTION OF THE DRAWINGS

FIG. 6(a) and FIG. 8(b) are illustrations showing concept of magnification of a picture.

It will be recognized that some or all of the Figures are schematic representations for purposes of illustration and do not necessarily depict the actual relative sizes or locations of the elements shown.

DESCRIPTION OF THE PREFERRED EMBODIMENT

Hereafter, preferred embodiments of the present invention are described with references to the accompanying drawings.

[First Embodiment]

Figure 1:
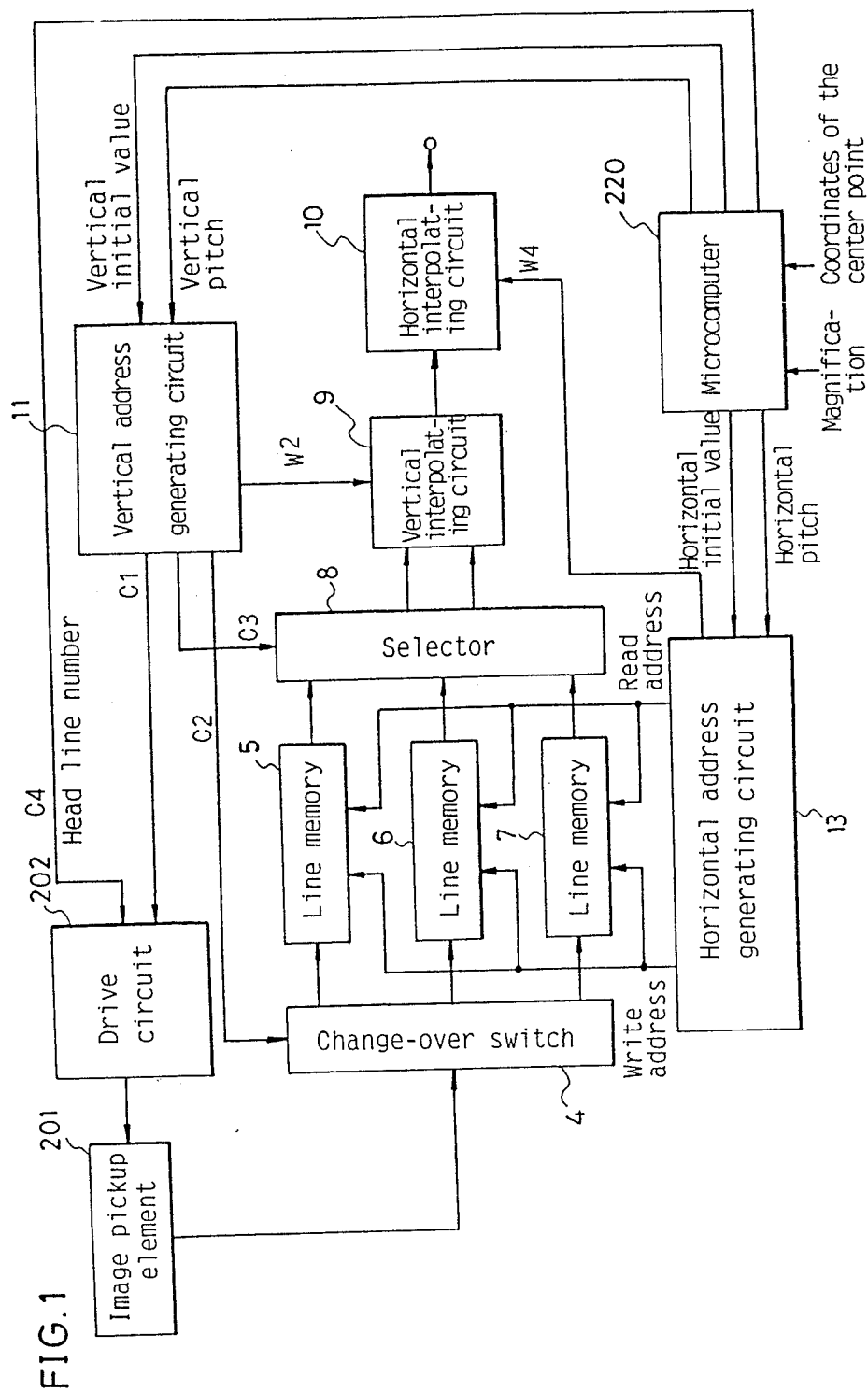
FIG. 1 is a block diagram showing an image pickup apparatus of a first embodiment of the present invention.

FIG. 1 is block diagram showing the image pickup apparatus of a first embodiment. The following description is based upon a case such that a CCD type image pickup element, which has a vertical transferring part comprising a construction of shift register, is employed as a solid-state image pickup element 201 and continuous zooming is carried out by means of a microcomputer 220. A drive circuit 202 controls to execute or stop vertical-transferring of the solid-state image pickup element 201 in accordance with a control signal C1. Electric charge for unnecessary scanning lines is swept by the drive circuit 202 in accordance with a control signal C4. Output signal of the image pickup element 201 is selectively given to line memories 5, 6 and 7 through a change-over switch 4 in response to a control signal C2. A selector 8 selects two of the line memories and issues data in response to a control signal C3. Output signal of the selector 8 is sent to a vertical interpolating circuit 9 and a horizontal interpolating circuit 10. A vertical address generating circuit 11 receives a vertical initial value and a vertical pitch signal from the microcomputer 220 as input signals. The vertical address generating circuit 11 generates the control signal C1 for controlling vertical transferring of the solid-state image pickup element 201, the control signals C2 and C3 for respectively controlling the change-over switch 4 and the selector 8, and a weight signal W2 for the vertical interpolating circuit 9. A horizontal address generating circuit 13 receives a horizontal initial value and a horizontal pitch signal from the microcomputer 220 as input signals. The horizontal address generating circuit 13 generates write address and read address for the line memories 5, 6 and 7 and weight signal W4 for the horizontal interpolating circuit 10. The vertical address generating circuit 11 and the horizontal address generating circuit 13 constitute a control signal generating circuit. According to random magnification and coordinates of the center of the partial image to be enlarged, the microcomputer 220 calculates to issue signals of the vertical initial value and the horizontal initial value, a vertical pitch and a horizontal pitch, and position of transferring head line of the solid state image pickup element 201.

Figure 2:
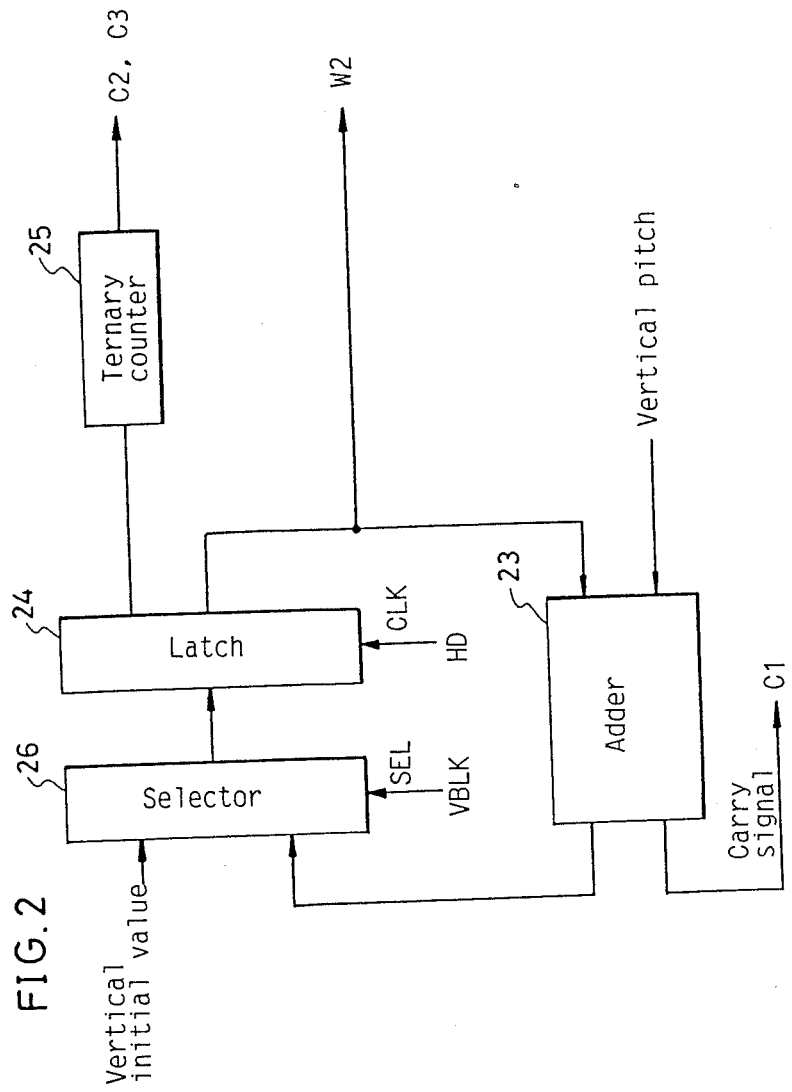
FIG. 2 is a block diagram showing a vertical address generating circuit of the first embodiment.

FIG. 2 is a block diagram showing the vertical address generating circuit 11. Initial value is set in a selector 28 during time period of vertical blanking (VBLK), and thereafter an adder 23 adds vertical pitch signals given thereto, at every line. Decimal processed in the adder 23 is issued through a latch 24 as the weight signal W2 for the vertical interpolating circuit 9. Carry signal of the adder 23 is issued as the control signal C1 and sent to a ternary couter 25. The lowest two bits of number processed in the ternary counter 25 are issued as the counter signals C2 and C3.

Figure 3:
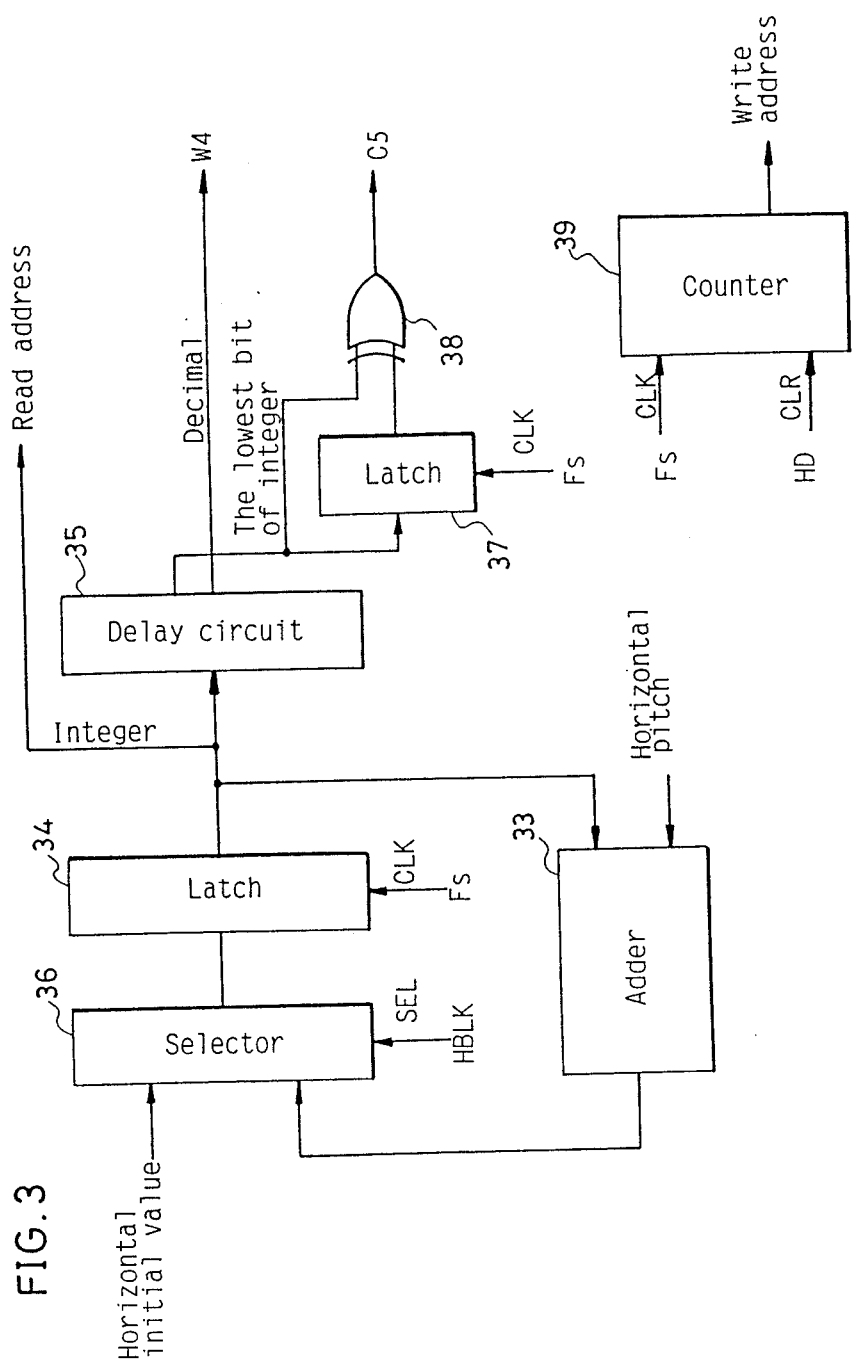
FIG. 3 is a block diagram showing a horizontal address generating circuit of the first embodiment.

FIG. 3 is a block diagram showing the horizontal address generating circuit 13. Initial value is set in a selector 38 during time period of horizontal blanking (HBLK), and thereafter an adder 33 adds horizontal pitch signals given thereto, at every picture element. Integer processed in the adder 33 is issued through a latch 34 as a read address signal for the line memories 5, 6 and 7 (FIG,. 1), and decimal of that is issued through a delay circuit 35 as the weight signal W4 for the horizontal interpolating circuit 10. The lowest bit of the integer is inputted to an exclusive OR gate 38 together with signal passed through a latch 37. The control signal C5 is issued from the exclusive OR gate 38 to the horizontal interpolating circuit 10 (FIG. 1). Write addresses for the line memories 5, 6 and 7 are issued from a counter 39.

Figure 4:
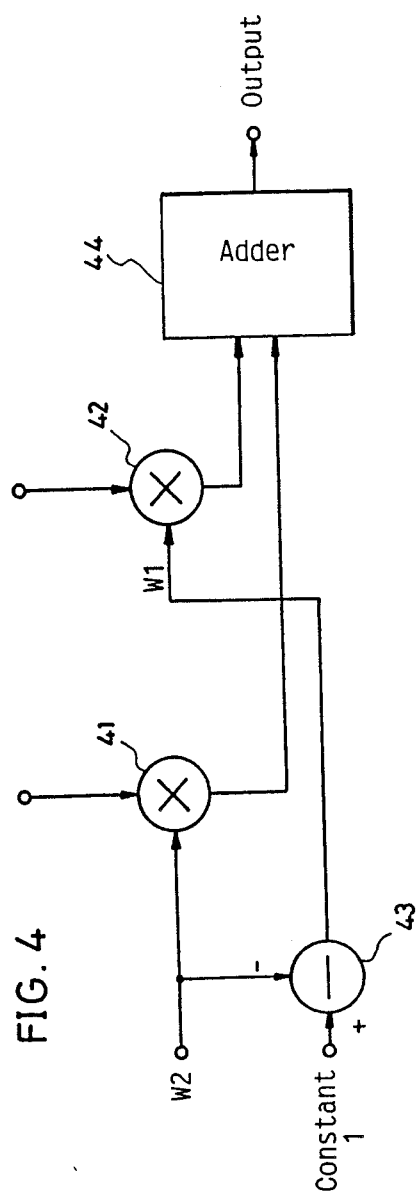
FIG. 4 is a block diagram showing a vertical interpolating circuit of the first embodiment.

FIG. 4 is a block diagram showing the vertical interpolating circuit 9. The circuit 9 comprises multipliers 41 and 42, a substracter 43 and an adder 44. Two picture element's signals weighed by the multipliers 41 and 42 are added each other by the adder 44 and issued therefrom.

Figure 5:
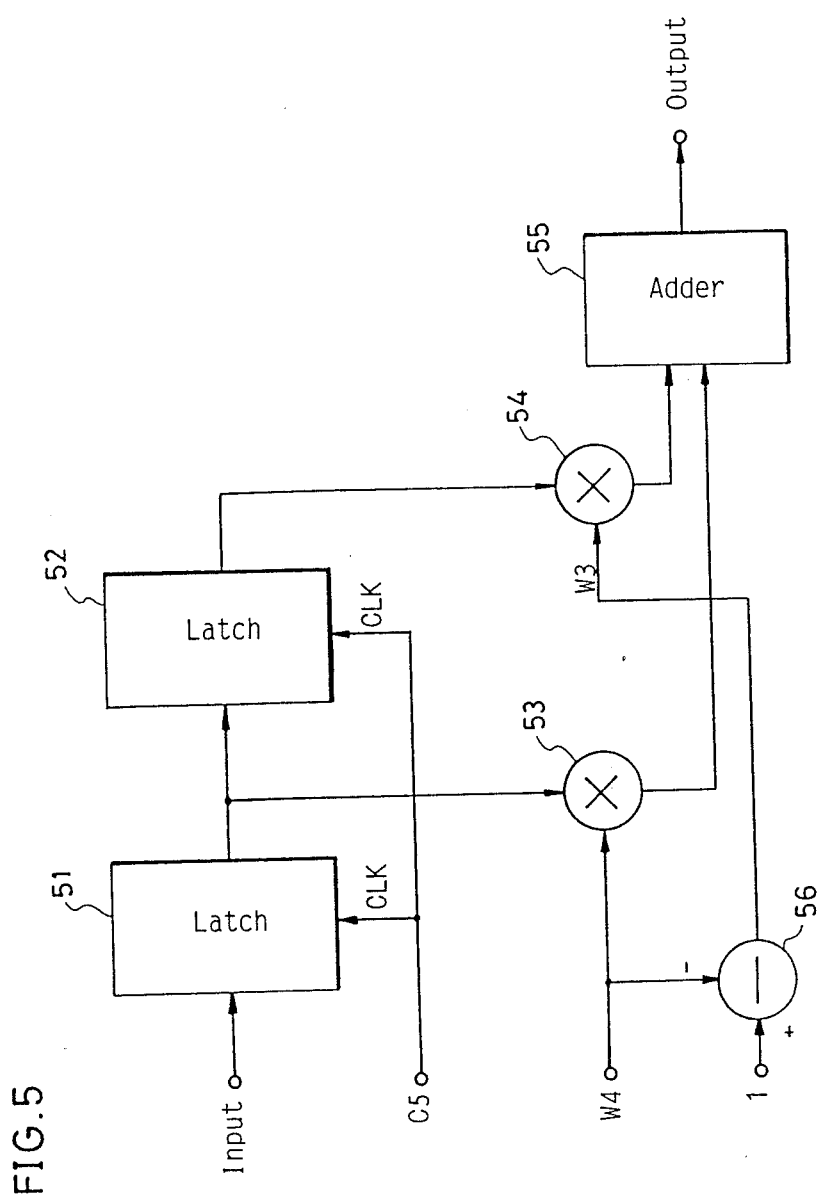
FIG. 5 is a block diagram showing a horizontal interpolating circuit of the first embodiment.

FIG. 5 is a block diagram showing the horizontal interpolating circuit 10. The circuit 10 comprises latches 51 and 52, multipliers 53 and 54, an adder 55 and a substracter 56. Signals of picture elements, which are mutually neighboring signals in the horizontal direction, are taken by the latches 51 and 52. Signals of two picture elements, which are weighted by the multiplier 53 and 54, are added to each other by the adder 55 and issued therefrom.

Figures 6A, 6B:
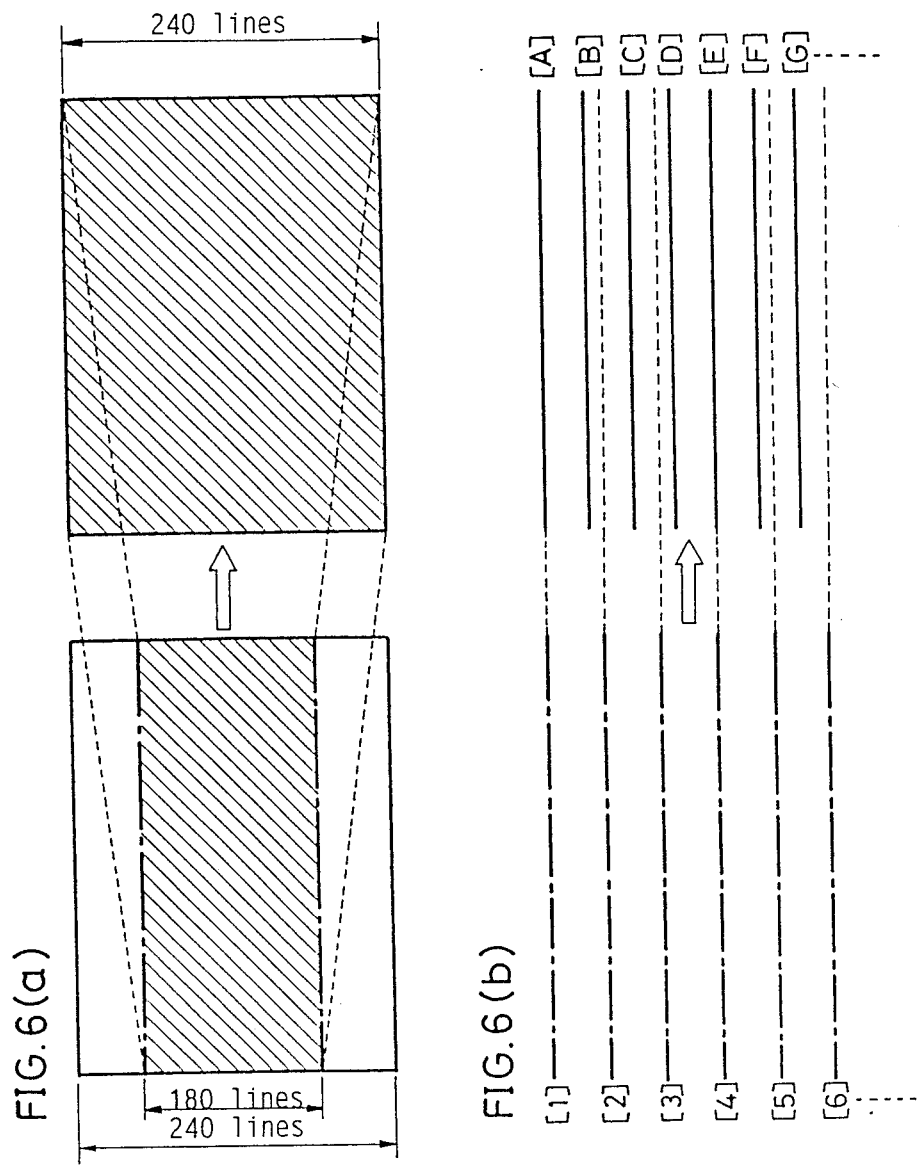
Figure 7:
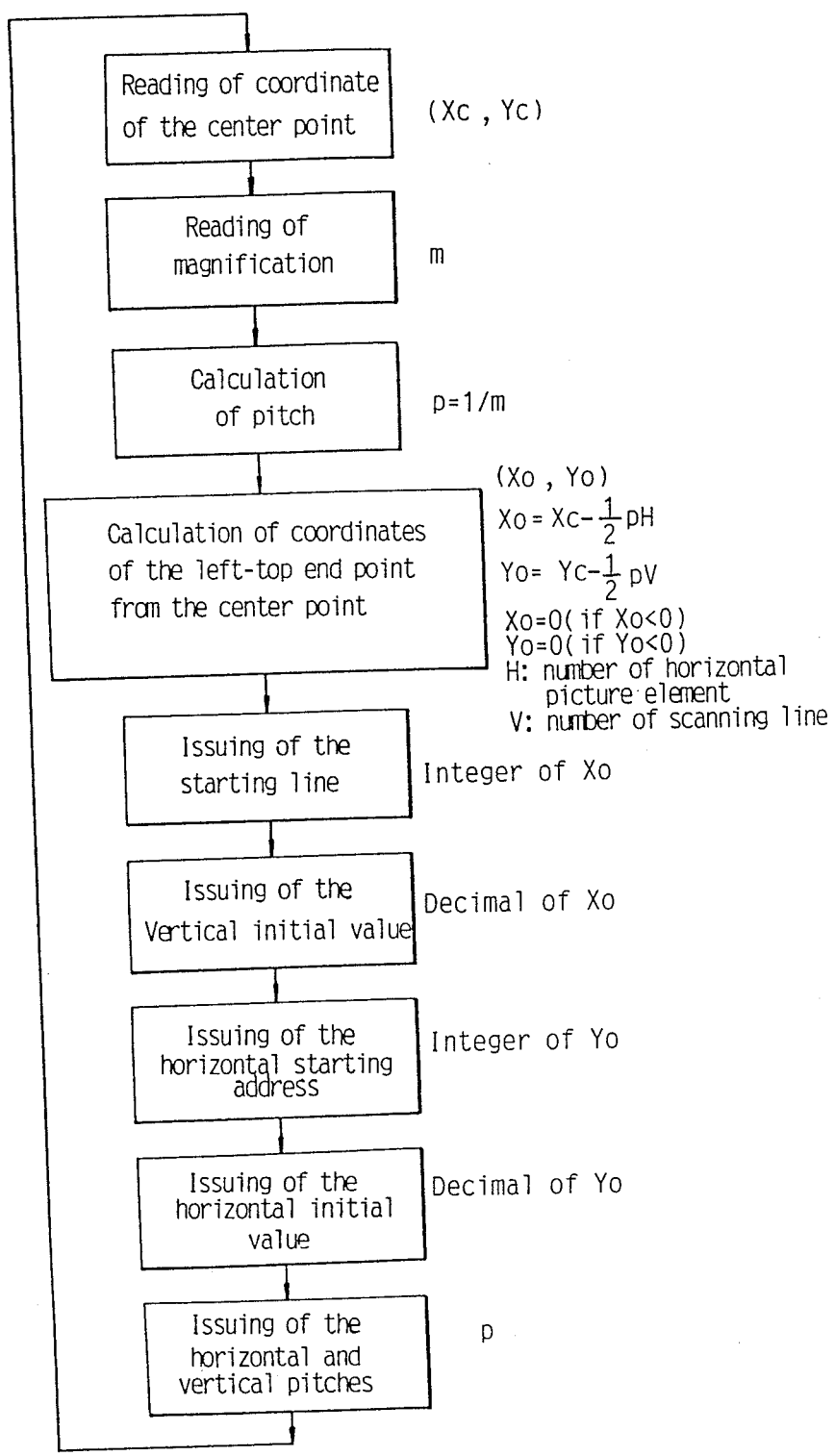
FIG. 7 is a flow-chart showing a process of a microcomputer 220 in accordance with the first embodiment.

Next, operation of the above-mentioned image pickup apparatus is described with reference to FIG. 6(a), FIG. 6(b) and FIGS. 1-5. For instance, proportional enlargement of 4/3 times in the vertical direction is shown. In the microcomputer 220, magnification of 4/3 and a central coordinates (Xc, Yc) are predetermined. In accordance with a flow-chart as shown in FIG. 7, the microcomputer 220 calculates a scanning starting line of the solid-state image pickup element 201 and vertical/horizontal initial values and pitches from the given magnification and the central coordinates, and the microcomputer 220 issues outputs to the drive circuit 202 for the image pickup element 201, the vertical address generating circuit 11 and the horizontal address generating circuit 13. A pitch of 0.75 is given to the vertical address generating circuit 11 in response to the magnification.

In the line memories 5, 6 and 7, data of scanning lines [2], [3], and [4], which are issued from the solid-state image pickup element 201, are stored, respectively. Firstly, interpolating of a scanning line D in described. Decimal of data which means vertical position of the scanning line D is held by the latch 24. To interpolate the scanning line D, a pair of scanning lines [3] and [4], which are upper line and lower line across the scanning line D, are utilized. The selector 8 operates to issue signal of the line memory 6 and signal of the line memory 7 to the multiplier 42 of the vertical interpolating circuit 9 and the multiplier 41 thereof, respectively. If decimal value of the vertical address of the scanning line D, which is held by the latch 24, is 0.25, value of W1 is set to be 0.75 and value of W2 is 0.25, in the vertical interpolating circuit 9. The multipliers 41 and 42 multiply weights into the scanning lines [3] and [4], respectively, and the weighted signals are added each other in the adder 44, thereby outputting interpolated signals of the scanning line D. At that time, adding of the next address is executed in the adder 23, and the vertical pitch 0.75 is added to the output 0.25 of the latch 24. Since sum is 1.00 (0.75+0.25), a carry signal C1 becomes 1, and this signal C1 is supplied to the drive circuit 202. Decimal 0.00 is written to the latch 24 by a next horizontal pulse HD. When the carry signal C1 becomes 1, the drive circuit 202 operates to vertically transfer the solid-state image pickup element 201, and a new signal of the scanning line [5] is issued from the solid-state image pickup element 201. A signal of the scanning line [2] stored in the line memory 5 is the oldest one among the signals of the scanning lines [2], [3] and [4]. It has already been unnecessary for interpolating after the scanning line D. Therefore, the change-over switch 4 selects the line memory 5 and operates to write the signal of the scanning line [5] issued from the solid-state image pickup element 201. Both the writing to the line memory and the reading from that, that is, reading of the scanning lines [3] and [4] and writing of the scanning line [5], are simultaneously executed.

Next, interpolating of the scanning line E is described. Since the data held by the latch 24 is 0.00, the signal of the scanning line [4] can be used as that of the scanning line E. At this time, the weight signal W1 supplied to the multiplier 42 is 1, and the weight signal W2 supplied to the multiplier 41 is zero, thereby operating to supply the multiplier 42 and 41 with signals of the scanning line [4] and [5], respectively. That is, the selector 8 issues the signal of the line memory 7 to the multiplier 42 and the signal of the line memory 5 to the multiplier 41. The signal of the scanning line [4], namely the scanning line E is therefore issued from the adder 44. At that time, adding of the next address is executed in the adder 23, and the vertical pitch 0.75 is added to the output 0.00 of the latch 24. Since sum is 0.75 (0.75+0.00), the carry signal C1 becomes zero, and this signal C1 is supplied to the drive circuit 202. Decimal 0.75 is written to the latch 24 by the next horizontal pulse HD. When the carry signal C1 becomes zero, the drive circuit 202 does not operate to vertically transfer the solid-state image pickup element 201, and nothing is issued from the solid-state image pickup element 201. Therefore, each of the line memories 5, 6 and 7 stores the present data.

The following Table 1 shows the above-mentioned selection of read/writing of the line memories 5, 6 and 7 and control of transferring of the solid-state image pickup element 201.

TABLE 1

| Present data of scanning line stored in the line memories | | | Scanning line to be interpolated | Scanning line to be read for interpolation | Transferring of the CCD | Next scanning line | Line memory to be written |
| --- | --- | --- | --- | --- | --- | --- | --- |
| 5 | 6 | 7 | | | | | |
| [2] | [3] | [1] | [C] | [2], [3] | ON | [4] | 7 |
| [2] | [3] | [4] | [D] | [3], [4] | ON | [5] | 5 |
| [5] | [3] | [4] | [E] | [4], [5] | OFF | — | — |
| [5] | [3] | [4] | [F] | [4], [5] | ON | [6] | 6 |
| [5] | [6] | [4] | [G] | [5], [6] | ON | [7] | 7 |
| [5] | [6] | [7] | [H] | [6], [7] | ON | [8] | 5 |
| [8] | [6] | [7] | [I] | [7], [8] | OFF | — | — |
| [8] | [6] | [7] | [J] | [7], [8] | ON | [9] | 6 |

The following Table 2 shows another selection of reading/writing of the line memories 5, 6 and 7 and another control of transferring of the solid-state image pickup element. In this operation shown by Table 2, the control signal C1 is delayed with one line against the operation of Table 1.

TABLE 2

| Present date of scanning line stored in the line memories | | | Scanning line to be interpolated | Scanning line to be read for interpolation | Transferring of the CCD | Next scanning line | Line memory to be written |
| --- | --- | --- | --- | --- | --- | --- | --- |
| 5 | 6 | 7 | | | | | |
| [2] | [3] | [1] | [C] | [2], [3] | ON | [4] | 7 |
| [2] | [3] | [4] | [D] | [3], [4] | ON | [5] | 5 |
| [5] | [3] | [4] | [E] | [4], [5] | ON | [6] | 6 |
| [5] | [6] | [4] | [F] | [4], [5] | OFF | — | — |
| [5] | [6] | [4] | [G] | [5], [6] | ON | [7] | 7 |
| [5] | [6] | [7] | [H] | [6], [7] | ON | [8] | 5 |
| [8] | [6] | [7] | [I] | [7], [8] | ON | [9] | 6 |
| [8] | [9] | [7] | [J] | [7], [8] | OFF | — | — |

By repeating the operation shown in Table 1 or 2 in the same way, vertical enlargement is peformed only by the line memories 5, 6 and 7.

Next, an example for horizontal enlargement is described. Outputs from the horizontal address generating circuit shown by FIG. 3 are used as read addresses for the lines memories 5, 6 and 7. Output signal from the vertical interpolating circuit 9 is supplied to the horizontal interpolating circuit shown by FIG. 5. Interpolation between two picture elements in the horizontal direction is executed by using the horizontal weight signal W4 generated by the horizontal address generating circuit shown by FIG. 3. This operation is very similar to that of vertical direction. By the latch 37 and the exclusive OR gate 38, change of the read address is detected. When the change is detected, the control signal C5 becomes 1, and the next picture element's signals are taken into the latches 51 and 52 of the horizontal interpolating circuit 10. Other operation is the same as that of the vertical enlargement.

As mentioned above, the image pickup apparatus of this embodiment can offer an electronic zoom image pickup apparatus which realizes special functions such as enlargement or reform of the picture by means of several line memories without lowering quality of the image. Besides, by changing the magnification given to the microcomputer 220 with lapse of time, continuous zooming like that of an optical zoom lens is obtained. Also, by changing the center of coordinates given to the microcomputer 220 as time lapses, continuous movement of pickup angle, e.g. pan or tilt of the image pickup apparatus, is realized.

Figure 8:
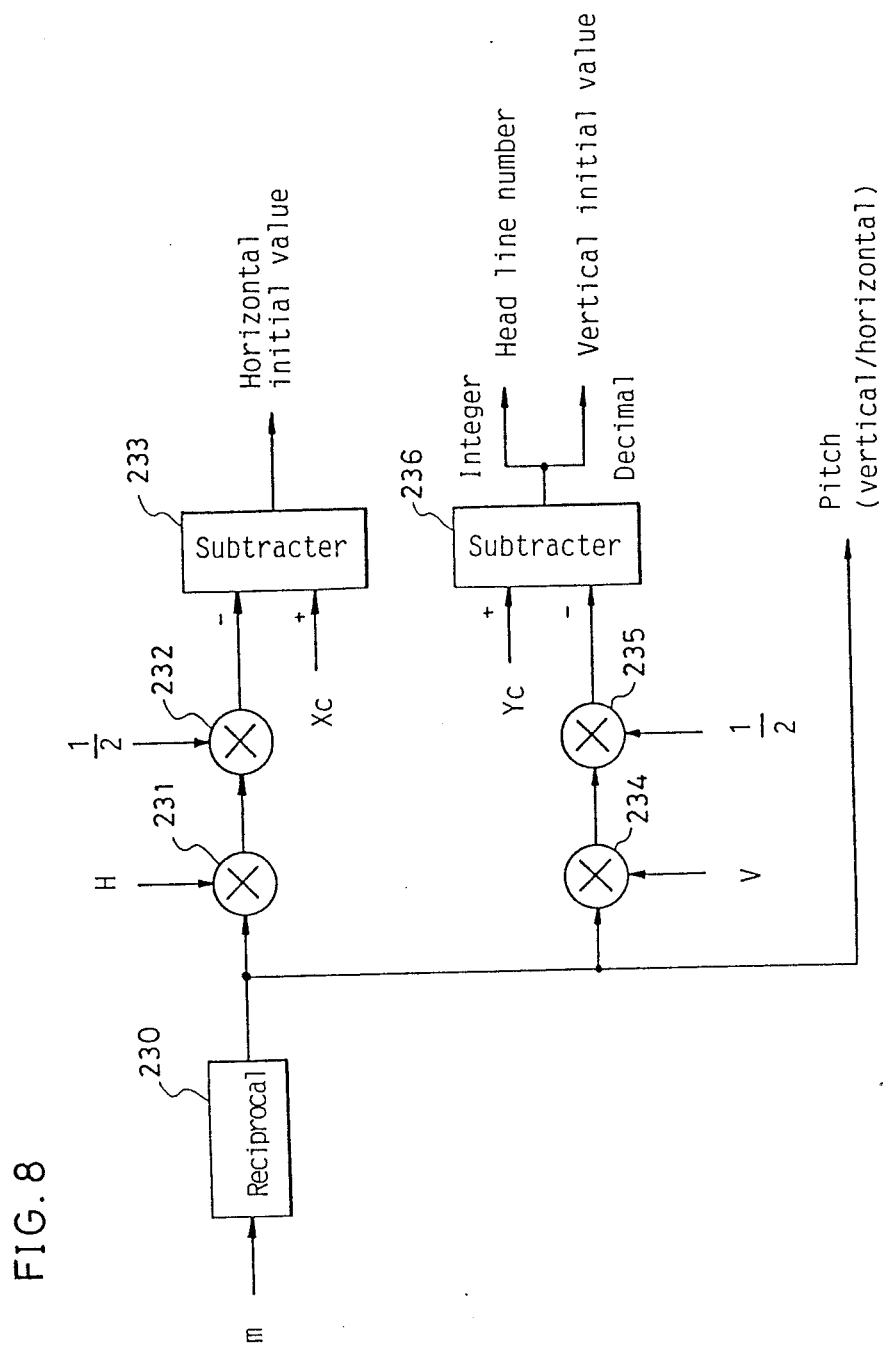
FIG. 8 is a block diagram showing a circuit which is constructed by logic circuit to follow the flow-chart of FIG. 7.

It is possible to equivalently replace the microcomputer 220 with a logical circuit-unit as shown in FIG. 8. This circuit-unit comprises a circuit 230 for obtaining reciprocal, multipliers 231, 232, 234 and 235 and subtractor 233 and 236. The circuit 230 finds a reciprocal p of the magnification m and issues the reciprocal p as vertical/horizontal pitches. The multiplier 231 multiplies the pitch p and a number H of the horizontal picture element together, and the multiplier 232 makes output of the multiplier 231 ½ times. The subtracter 233 subtracts the output of the multipliers 232 from a horizontal coordinates Xc of the central coordinates given thereto, and output signal of the substacter 233 is issued as a horizontal initial value. The multiplier of 234 multiplies the pitch p by a number V of the scanning lines in one field, and the multiplier 235 makes output of the multiplier 234 ½ times. The subtracter 236 subtracts output of the multiplier 235 from a vertical coordinates Yc of the central coordinates given thereto. Integer of output signal of the subtracter 236 is issued as a starting line number of vertical scanning, and decimal of that is issued as a vertical initial value.

Although above-mentioned description is made with respect to the same magnification of vertical and horizontal directions, different magnifications to each may be employed.

Also, in the above-mentioned construction, although there are three lines memories and the interpolation is executed by using two scanning lines in the vertical direction, higher order interpolation can be executed by increasing the scanning lines to be used for the interpolation. At that time, number of the line memories is required to be at leased one more than the number of the scanning lines to be used for the interpolation. When a dual port memory is employed to simultaneously write/read data, number of the line memories may be one fewer than that of the above-mentioned case. However, crossfire may occur in the output image at a certain read/write timing of the line memories.

Further, although there is not provided in this embodiment, a processing circuit (not shown) is generally provided between the image pickup element 201 and the change-over switch 4 or at the next step of the block diagram shown by FIG. 1 in order to obtain luminance signal and chrominance signal.

[Second Embodiment]

Figure 9:
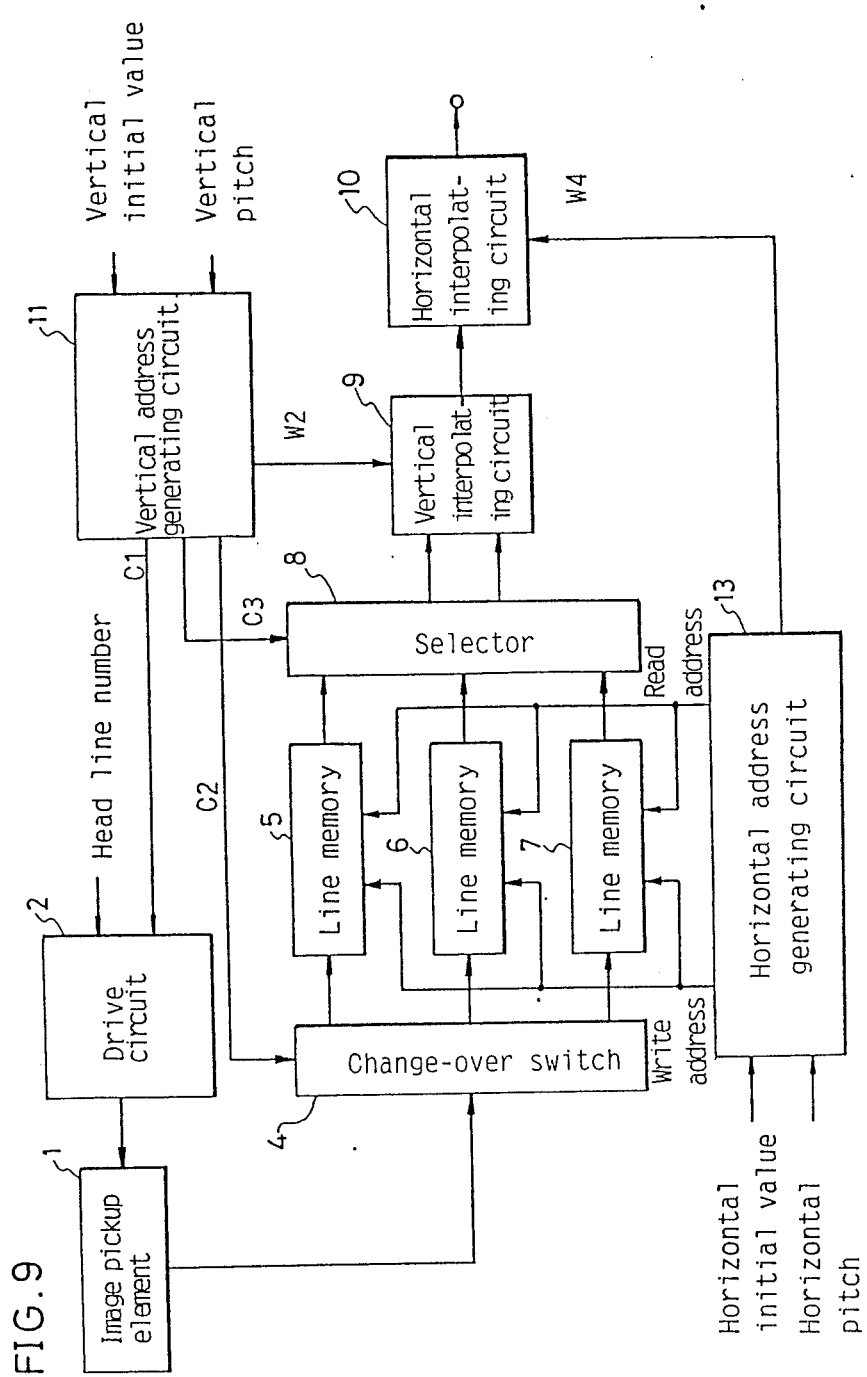
FIG. 9 is a block diagram showing the image pickup apparatus of a second embodiment of the present invention.

FIG. 9 is a block diagram showing the image pickup apparatus of a second embodiment. The following description is based upon a case such that a CCD type image pickup element, which has a vertical transferring part comprising a construction of shift register, is employed as a solid-state image pickup element 1. A drive circuit 2 controls to execute or stop vertical-transferring of the solid-state image pickup element 1 in accordance with a control signal C1. Electric charge for unnecessary scanning lines is swept by the drive circuit 2 in accordance with a control signal C1. Output signal of the solid-state image pickup element 1 is selectively give to line memories 5, 6 and 7 through a change-over switch 4 in response to a control signal C2. A selector 8 selects two of the line memories and issues data in response to a control signal C3. Output signal of the selector 8 is sent to a vertical interpolating circuit 9 and a horizontal interpolating circuit 10. A vertical address generating circuit 11 recevices a vertical initial value and a vertical pitch signal as input signals. The vertical address generating circuit 11 generates the control signal C1 for controlling vertical transferring of the solid-state image pickup element 1, the control signals C2 and C3 for respectively controlling the change-over switch 4 and the selector 5, and a weight signal W2 for the vertical interpolating circuit 9. A horizontal address generating circuit 13 receives a horizontal initial value and a horizontal pitch signal as input signals. The horizontal address generating circuit 13 generates write address and read address for the line memories 5, 6 and 7 and weight signal W4 for the horizontal interpolating circuit 10. The vertical address generating circuit 11 and the horizontal address generating circuit 13 constitute a control signal generating circuit.

FIG. 2 is a block diagram showing the vertical address generating circuit 11. FIG. 3 is a block diagram showing the horizontal address generating circuit 13. FIG. 4 is a block diagram showing the vertical interpolating circuit 9. FIG. 5 is a block diagram showing the horizontal interpolating circuit 10. Description concerning these circuits are the same as described in the first embodiment.

Next, operation of the above-mentioned image pickup apparatus is described with reference to FIG. 6(a), FIG. 6(b) and FIGS. 1–5. For instancce, proportional enlargement of 4/3 times in the vertical direction is shown. In the vertical address generating circuit 11, a pitch of 0.75 corresponding to magnification is predetermined. In the line memories 5, 6 and 7, data of scanning lines [2], [3], and [4], which are issued from the solid-state image pickup element 1, are stored, respectively. First, interpolation of a scanning line D is described. Decimal of data which means vertical position of the scanning line D is held by the latch 24. To interpolate the scanning line D, a pair of scanning lines [3] and [4], which are upper line and lower line across the scanning line D, are utilized. The selector 8 operates to issue signal of the line memory 6 and signal of the line memory 7 to the multiplier 42 of the vertical interpolating circuit 9 and the multiplier 41 thereof, respectively. If decimal value of the vertical address of the scanning line D, which is held by the latch 24, is 0.25, value of W1 is set to be 0.75 and value of W2 is 0.25, in the vertical interpolating circuit 9. The multipliers 41 and 42 multiply weights on the scanning lines [3] and [4], respectively, and the weighted signals are added each other in the adder 44, thereby outputting interpolated signals of the scanning line D. At that time, adding of the next address is executed in the adder 23, and the verical pitch 0.75 is added to the output of 0.25 of the latch 24. Since sum is 1.00 (0.75+0.25), a carry signal C1 becomes 1, and this signal C1 is supplied to the drive circuit 2. Decimal 0.00 is written to the latch 24 by a next horizontal pulse HD. When the carry signal C1 becomes 1, the drive circuit 2 operates to vertically transfer the solid-state image pickup element 1, and a new signal of the scanning line [5] is issued from the solid-state image pickup element 1. A signal of the scanning line [2] stored in the line memory 5 is the oldest one among the signals of the scanning lines [2], [3] and [4]. After the scanning of the line D, it has already been unnecessary for interpolation. Therefore, the change-over switch 4 selects the line memory 5 and operates to write the signal of the scanning line [5] issued from the solid-state image pickup element 1. Both writing to the line memory and reading from that, namely reading of the scanning lines [3] and [4] and writing of the scanning lines [5], are simultaneously executed.

Next, interpolation of the scanning line E is described. Since the data held by the latch 24 is 0.00, signal of the scanning line [4] can be used as that of the scanning line E. At this time, the weight signal W1 supplied to the multiplier 42 is 1, and the weight signal W2 supplied to the multiplier 41 is zero, thereby operating to supply the multiplier 42 and 41 with signals of the scanning line [4] and [5], respectively. That is, the selector 8 issues the signal of the line memory 7 to the multiplier 42 and the signal of the line memory 5 to the multiplier 41. The signal of the scanning line [4], namely the scanning line E is therefore issued from the adder 44. At that time, adding of the next address is executed in the adder 23, and the vertical pitch 0.75 is added to the output 0.00 of the latch 24. Since sum is 0.75 (0.75+0.00), the carry signal C1 becomes zero, and this signal C1 is supplied to the drive circuit 2. Decimal 0.75 is written to the latch 24 by the next horizontal pulse HD. When the carry signal C1 becomes zero, the drive circuit 2 does not operate to vertically transfer the solid-state image pickup element 1, and nothing is issued from the solid-state image pickup element 1. Therefore, each of the line memories 5, 8 and 7 stores the present data.

The above-mentioned selection of reading/writing of the line memories 5, 6 and 7 and control of transferring of the solid-state image pickup element 1 are shown in Table 1 and Table 2 in the same way as the first embodiment. In the operation shown by Table 2, the control signal C1 is delayed with one line against the operation of Table 1.

By repeating the operation shown in Table 1 or 2 in the same way, vertical enlargement is performed only by the line memories 5, 6 and 7.

Next, an example for horizontal enlargement is described. Outputs from the horizontal address generating circuit shown by FIG. 3 are used as read addresses for the line memories 5, 6 and 7. Output signal from the vertical interpolating circuit 9 is supplied to the horizontal interpolating circuit shown by FIG. 5. Interpolation between two picture elements in the horizontal direction is executed by using the horizontal weight signal W4 generated by the horizontal address generating circuit shown in FIG. 3. This operation is very similar to that of vertical direction. By the latch 37 and the exclusive OR gate 38, change of the read address is detected. When the change is detected, the control signal C5 becomes 1, and the next picture element's signals are taken into the latches 51 and 52 of the horizontal interpolating circuit 10. Other operation is the same as that of the vertical enlargement.

As mentioned above, the image pickup apparatus of this embodiment can offer an electronic zoom image pickup apparatus which realizes special functions such as enlargement or reform of the picture by means of several line memories without declining quality of the image.

[Third Embodiment]

Figure 10:
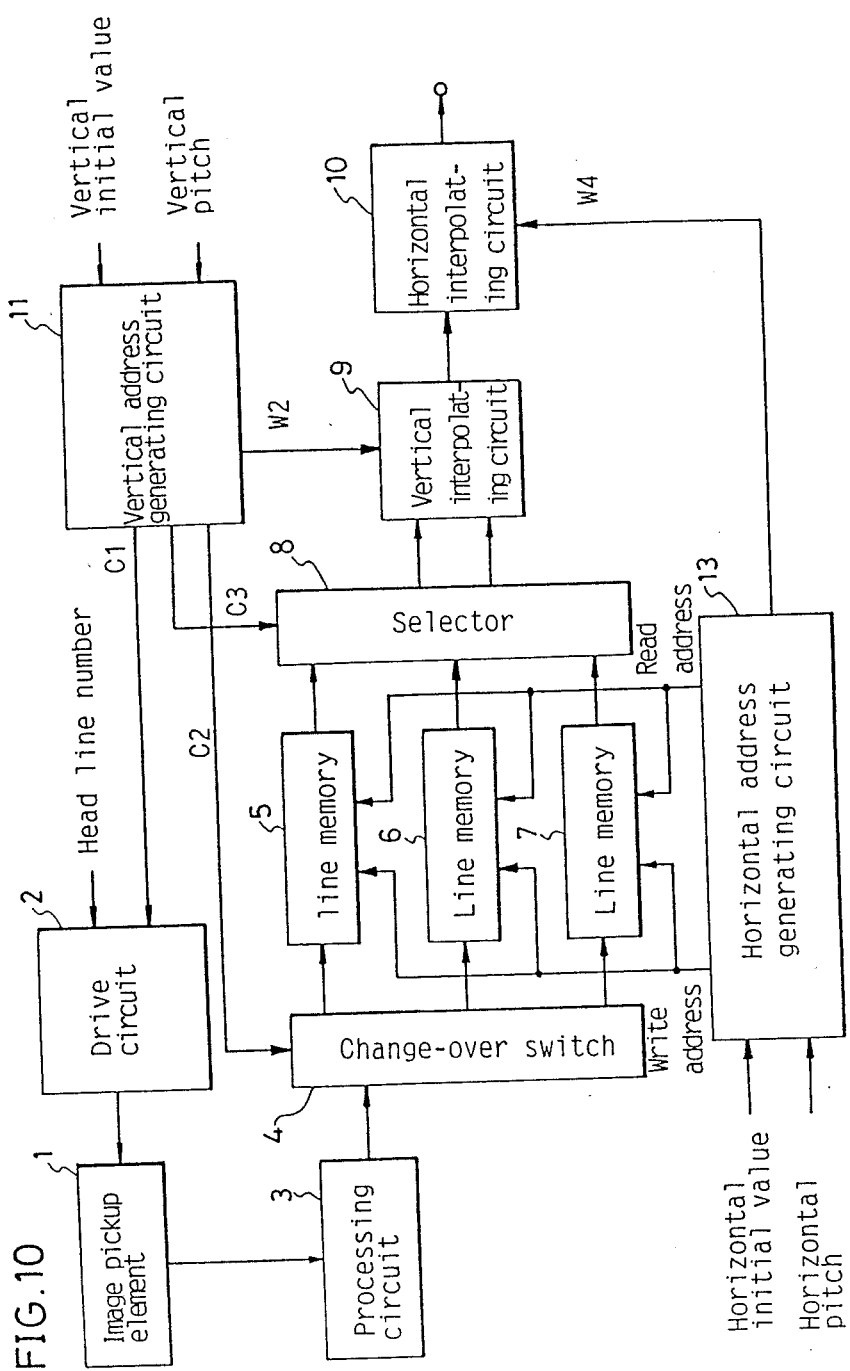
FIG. 10 is a block diagram showing the image pickup apparatus of a third embodiment of the present invention.

FIG. 10 is a block diagram showing the image pickup apparatus of a third embodiment. The image pickup apparatus has an electronic zooming function and is characterized by providing a processing circuit 3 which generates luminance signal andd chrominance signal from output of an image pickup element 1.

The image pickup element 1 has a vertical transferring part comprising a construction of shift register such as CCD. A drive circuit 2 controls to execute or stop vertical-transferring of the solid-state image pickup element 1 in accordance with a control signal C1. Electric charge for unnecessary scanning lines is swept by the drive circuit 2 in accordance with a control signal C4. The luminance signal and the chrominance signal or a chromiance-difference signal are obtained from the output signals of the solid state image pickup element 1 by means of the processing circuit 3. Output signal of the processing circuit 3 is selectively given to line memories 5, 6 and 7 through a change-over switch 4 in response to a control signal C2. A selector 8 selects two of the line memories and issues data in response to a control signal C3. Output signal of the selector 8 is sent to a vertical interpolating circuit 9 and a horizontal interpolating circuit 10. A vertical address generating circuit 11 receives a vertical initial value and a vertical pitch signal which are preset. The vertical address generating circuit 11 generates the control signal C1 for controlling vertical transferring of the image pickup element 1, the control signals C2 and C3 for respectively controlling the change-over switch 4 and the selector 8, and weight signal W2 for the vertical interpolating circuit 9. A horizontal address generating circuit 13 receives a horizontal initial value and a horizontal pitch signal and generates write address and read address for the line memories 5, 6 and 7 and weight signal W4 for the horizontal interpolating circuit 10.

In FIG. 10, construction except the processing circuit 3 is the same one as that of the second embodiment (FIG. 9). Therefore, electronic enlargement or reform of the luminance signal and the chrominance signal which are obtained by the processing circuit 3 are carried out in the same way as that of the second embodiment.

[Fourth Embodiment]

Figure 11:
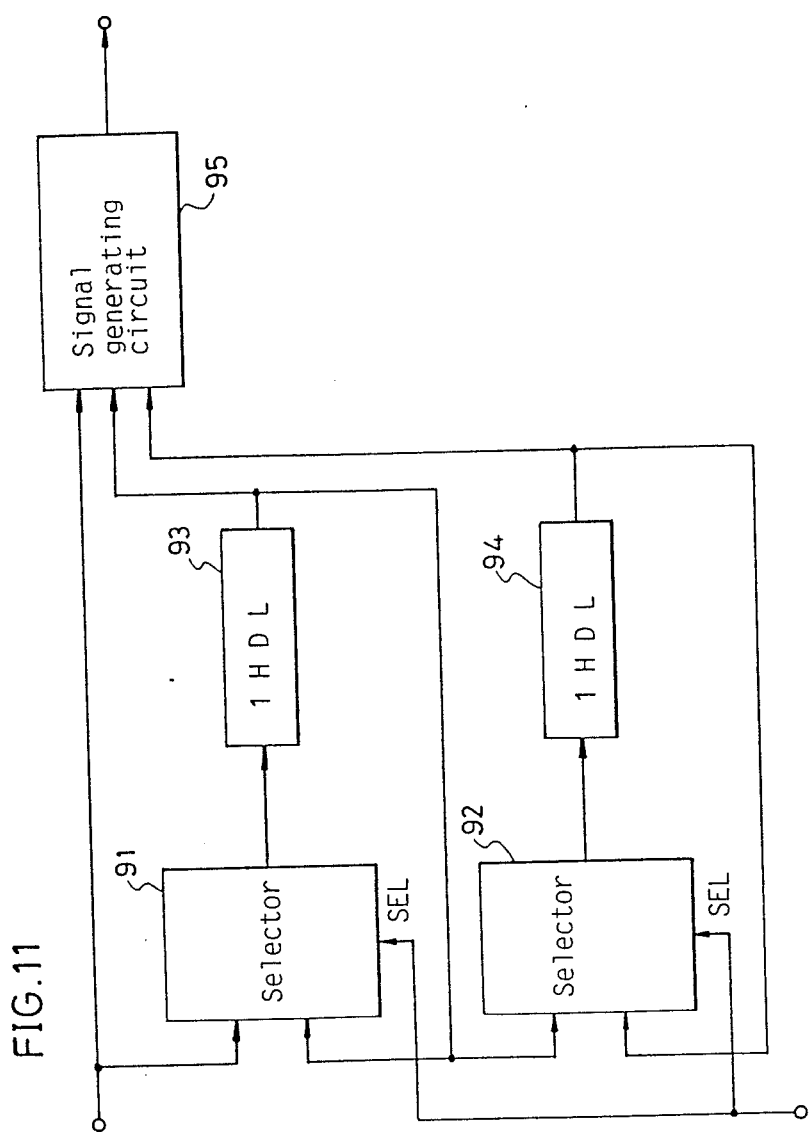
FIG. 11 is a block diagram showing a processing circuit of the image pickup apparatus of a fourth embodiment in accordance with the present invention.

In the embodiment, there is further provided a delay line in the processing circuit 3 shown in FIG. 10 of the third embodiment. Corresponding parts and components to the third embodiment are shown by the same numerals and marks, and the description thereon made in the third embodiment similarly applies. FIG. 11 is a block diagram showing the processing circuit 3 of the image pickup apparatus in accordance with the fourth embodiment.

In FIG. 11, a pair of selectors 91 and 92 select input signals of a pair of delay lines 93 and 94 in response to the control signal C1 issued from the vertical address generating circuit 11. Each of the delay lines (hereinafter is referred as 1HDL) 93 and 94 delays signal of one horizontal scanning time period. A signal generating circuit 95 generates the luminance signal or the chrominance signal by utiilizing output signals of the 1HDL 93 and 94 and the solid-state image pickup element 1. The selectors 91, 92, the 1HDL 93, 94 and the signal generating circuit 95 constitute the process circuit 3.

Next, operation of the above-mentioned image pickup apparatus is described. The operation of this embodiment is similar to that of the second embodiment. When the control signal C1 operates to execute transferring of solid-state image pickup element 1, each of the selector 91 and 92 issues output signal for writing signal of the next scanning line in each of the 1HDL 93 and 94. When the control signal C1 operates to stop transferring of the solid-state image pickup element 1, each of the selector 91 and 92 issues output signal for writing the same signal again in each of the 1HDL 93 and 94. Operation of other parts is the same as that of the second embodiment. Thus, the similar effect to that of the second embodiment are also obtainable as to signal processing method which generates the luminance signal and the chrominance signal by using vertical correlation with the delay line such as a three-image sensors camera or a two or one image sensor camera.

[Fifth Embodiment]

Figure 12:
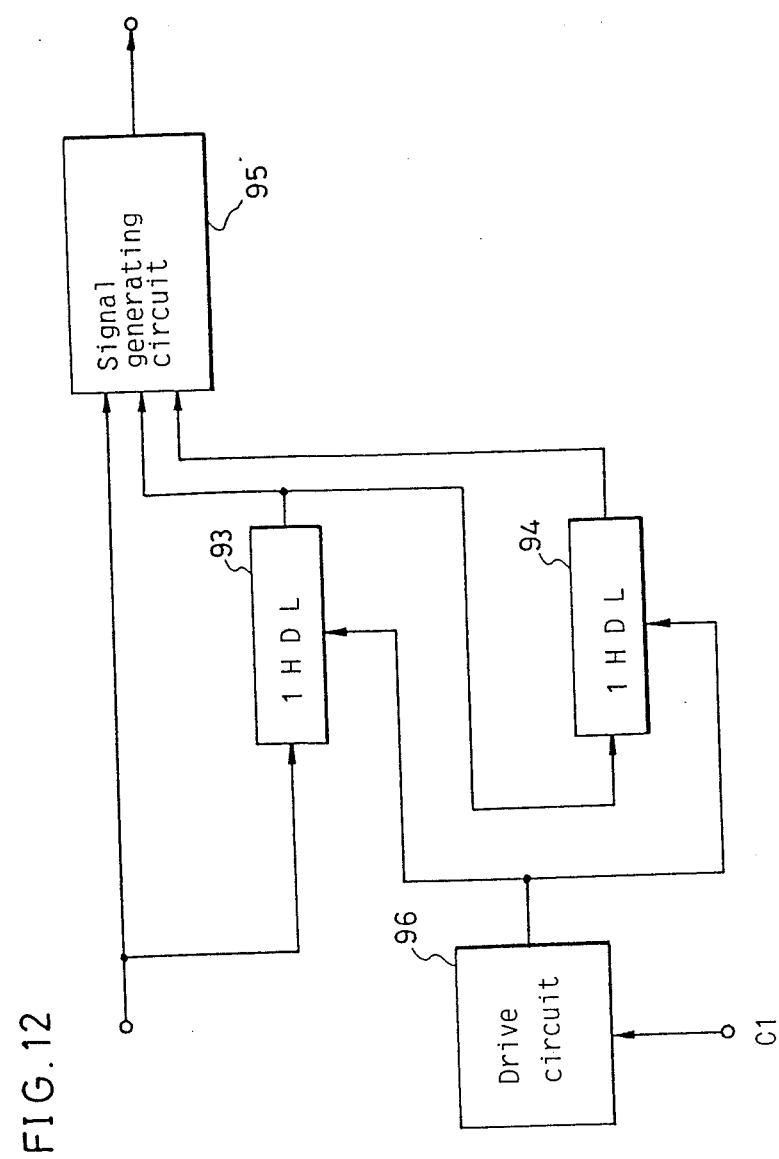
FIG. 12 is a block diagram showing a processing circuit of the image pickup apparatus of a fifth embodiment in accordance with the present invention.

In this embodiment, there is further provided a delay line of the CCD or digital in the processing circuit 3 shown in FIG. 10 of the third embodiment. Corresponding parts and components to the third embodiment are shown by the same numerals and marks, and the description thereon made in the third embodiment similarly applies. FIG. 12 is a block diagram showing the processing circuit 3 of the image pickup apparatus in accordance with the fifth embodiment.

In FIG. 12, a drive circuit 96 controls to drive or stop a pair of delay lines 93 and 94 in response to the control signal C1 issued from the vertical address generating circuit 11. Each of the delay lines (hereinafter is referred as 1HDL) 93 and 94 delays signal of one horizontal scanning time period. A signal generating circuit 95 generates the luminance signal or the chrominance signal by utilizing output signals of the 1HDL 93 and 94 and the solid-state image pickup element 1. The drive circuit 98, the 1HDL 93, 94 and the signal generating circuit 95 constitute the processing circuit 3.

Next, operation of the above-mentioned image pickup apparatus is described. The operation of this embodiment is similar to that of the second embodiment. When the control signal C1 operates to execute transferring of solid-state image pickup element 1, the drive circuit 96 issues output signal for writing signal of the next scanning line in each of the 1HDL 93 and 94. When the control signal C1 operates to stop transferring of the solid-state image pickup element 1, the drive circuit 96 stops driving of each of the 1HDL 93 and 94. Operation of other parts is the same as that of the second embodiment. Thus, the similar effects to that of the second embodiment are also obtainable as to signal processing method which generates the luminance signal and the chrominance signal by using vertical correlation with the delay line such as a three-image sensors camera or a two or one image sensor camera.

[Sixth Embodiment]

Figure 13:
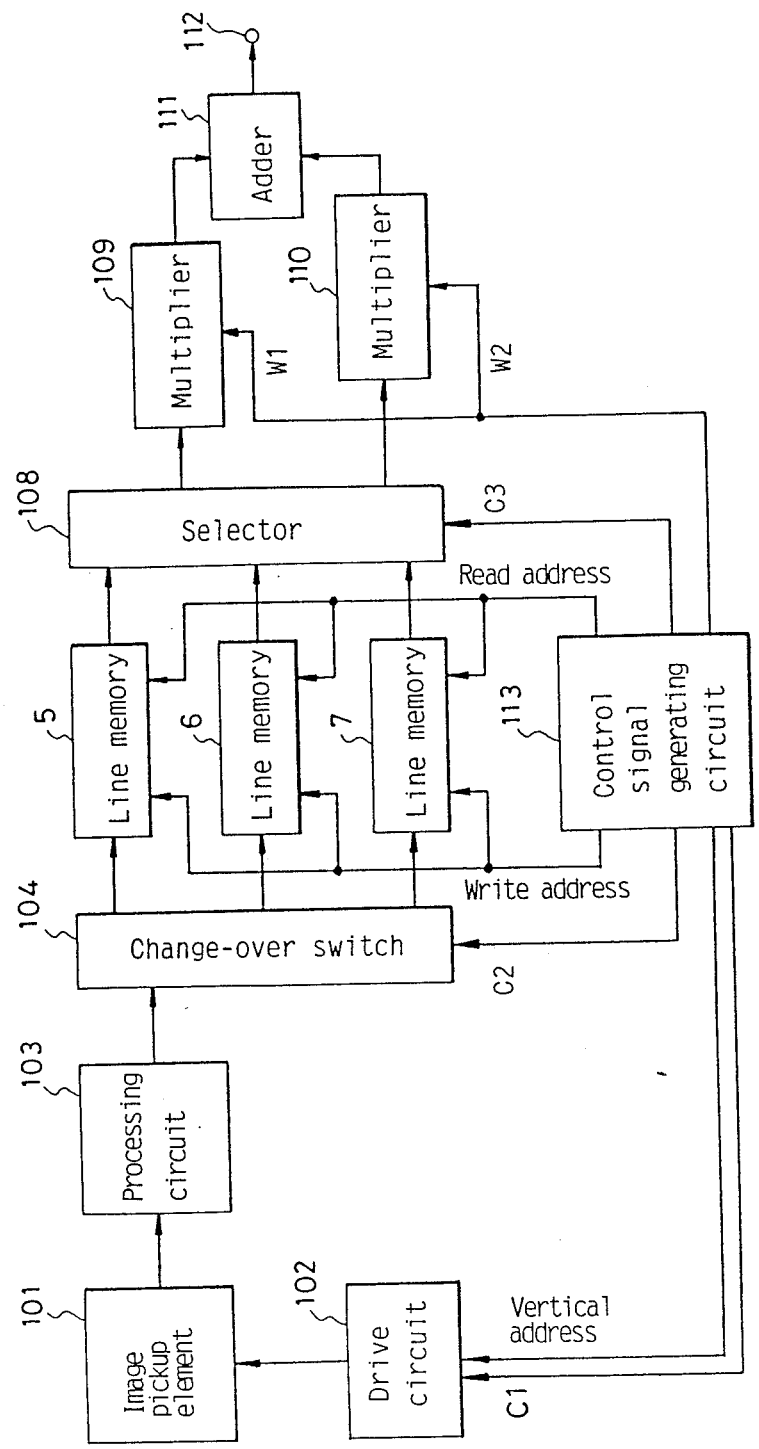
FIG. 13 is a block diagram showing the image pickup apparatus of a sixth embodiment of the present invention.

FIG. 13 is a block diagram showing the image pickup apparatus of a sixth embodiment. A solid-state image pickup element 101 is of a type which is scanned with X-Y address like a MOS type. A drive circuit 102 supplies vertical and horizontal scanning pulses to drive the solid-state image pickup element 101. Vertical scanning of the image pickup element 101 is executed or stopped in response to a control signal C1, and a head line number of vertical scanning is determined by a control signal C4. Luminance signal and chrominance signal are obtained from output signal of the solid-state image pickup element 101 by means of a processing circuit 103. Output signal of the procssing circuit 103 is selectively given to the line memories 5, 6 and 7 through a change-over switch 104 in response to a control signal C2. A selector 108 selects two of the line memories and issues data in response to a control signal C3. Multipliers 109 and 110 multiply output signal of the selector 108 by weight signals W1 and W2, respectively. Scanning line's signal of an upper side of the picture is supplied to the multiplier 109, and scanning line's signal of a lower side of the picture is supplied to the multiplier 110. An adder 111 addes output signals of the multipliers 109 and 110 each other and issues output signal to an output terminal 112. A control signal generating circuit 113 supplies the control signals and the weight signal to each part and also supplies the addess signals to the line memories 5, 6 and 7.

Figure 14:
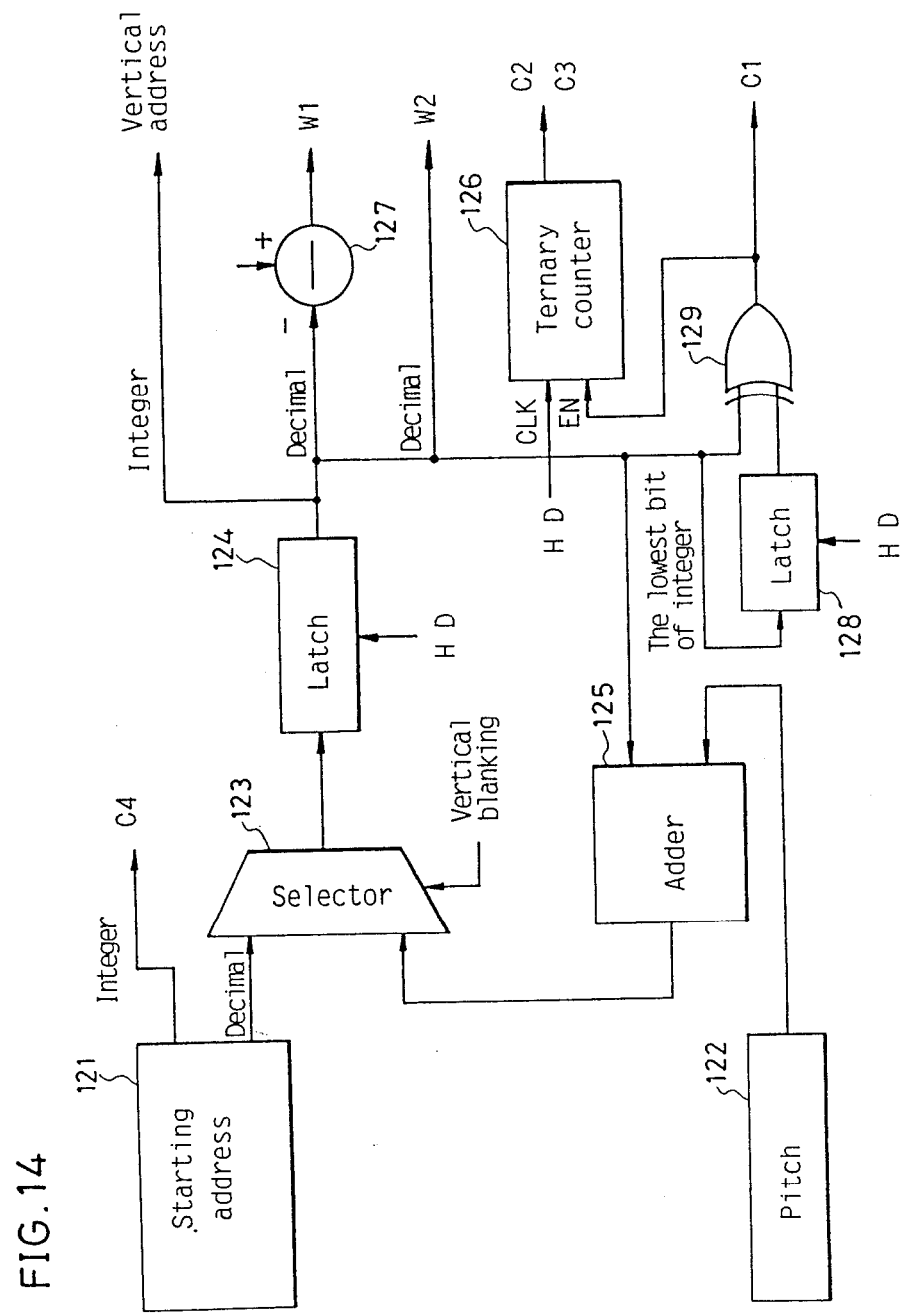
FIG. 14 is a block diagram showing a control signal generating circuit 113 of the sixth embodiment.

FIG. 14 is a block diagram showing the control signal generating circuit 113. A starting address register 121 specifies a starting position of the scanning lines for a desired part of the picture to be enlarged. For example, interval between the scanning lines in respective fields is selected to be 1. Integer of the starting address is issued as a starting line number C4 of vertical scanning, and decimal of the starting address is issued to a selector 123. A pitch register 122 specifies a value which is converted from interval of the scanning lines of an enlarged picture to that of an original picture. When the picture is enlarged, the above-mentioned value is below 1. The selector 123 issues the initial value from the starting address 121 during the vertical blanking, and issues the signal from the adder 125 except the time of vertical blanking, thereby to form a looped circuit by the selector 123, the latch 124 and the adder 125. A latch 124 latches input signal once at each line. An adder 125 adds output of the latch 124 with output of the pitch resistor 122. A carry signal is issued as C1 and other lower digits of the signal is issued to the selector 123. A ternary counter 126 counts HD only at the time when value of C1 is 1, thereby issuing counting value as C2 and C3. Output signal of the latch 124 is used as a weight signal W2 ($0 \leq W2 < 1$). A subtracter 127 executes subtracting of $(1-W2(=W1))$ and issues output signal as a weight signal W1 ($0 < W1 \leq 1$).

Next, operation of the above-mentioned image pickup apparatus is described with reference to FIG. 8(a), FIG. 6(b), FIG. 13 and FIG. 14. For instance, proportional enlargement of 4/3 times in the vertical direction is shown. A pitch of 0.75 is given to the pitch resistor 122 in response to the magnification. In the line memories 5, 6 and 7, data of scanning lines [2], and [3] and [4], which are issued from the solid-state image pickup element 101, are stored respectively. Firstly, interpolation of a scanning line D is described. Decimal of data which means vertical position of the scanning line D is held by the latch 124. To interpolate the scanning line D, a pair of scanning lines [3] and [4], which are upper line and lower line across the scanning line D, are utilized. The selector 108 operates to issue signal of the line memory 8 and signal of the line memory 7 to the multiplier 109 and the multiplier 110, respectively. If decimal value of the vertical address of the scanning line D, which is held by the latch 124, is 0.25, value of W1 is set to be 0.75 and value of W2 is 0.25, in the control signal generating circuit 113. The multipliers 109 and 110 multiply weights on the scanning lines [3] and [4], respectively, and the weighted signals are added each other in the adder 111, thereby outputting interpolated signals of the scanning line D. At that time, adding of the next address is executed in the adder 125, and the pitch 0.75 of the pitch register 122 is added to the output 0.25 of the latch 124. Since sum is 1.00 (0.75+0.25), a carry signal C1 becomes 1, and this signal C1 is supplied to the drive circuit 102. Decimal 0.00 is written to the latch 124 by a next horizontal pulse HD. When the carry signal C1 becomes 1, the drive circuit 102 operates to scan the next line of the solid-state image pickup element 101, and a new signal of the scanning line [5] is issued from the solid-state image pickup element 101. A signal of the scanning line [2] stored in the line memory 5 is the oldest one among the signals of the scanning lines [2], [3] and [4]. It has already been unnecessary for interpolation after the scanning line D. Therefore, the change-over switch 104 selects the line memory 5 and operates to write the signal of the scanning line [5] issued from the solid-state image pickup element 101. Both writing to the line memory and reading from that, namely reading of the scanning lines [3] and [4] and writing of the scanning line [5], are simultaneously executed.

Next, interpolation of the scanning line E is described. Since the data held by the latch 124 is 0.00, the signal of the scanning line [4] can be used as that of the scanning line E. At this time, the weight signal W1 supplied to the multiplier 109 is 1, and the weight signal W2 supplied to the multiplier 110 is zero, thereby operating to supply the multiplier 109 and 110 with signals of the scanning line [4] and [5], respectively. That is, the selector 108 issues the signal of the line memory 7 to the multiplier 109 and the signal of the line memory 5 to the multiplier 110. The signal of the scanning line [4], namely the scanning line E is therefore issued from the adder 111. At that time, adding of the next address is executed in the adder 125, and the pitch 0.75 of the pitch register 122 is added to the output 0.00 of the latch 124. Since sum is 0.75 (0.75+0.00), the carry signal C1 becomes zero, and the signal C1 is supplied to the drive circuit 102. Decimal 0.75 is written to the latch 124 by the next horizontal pulse HD. When the carry signal C1 becomes zero, the drive circuit 102 does not operate to scan the next line of the solid-state image pickup element 101, and reading of the same scanning line as aforeread is executed but nothing to use is issued from the solid-state image pickup element 101. Therefore, each of the lne memories 5, 6 and 7 stores the present data.

The above-mentioned selection of reacting/writing of the line memories 5, 6 and 7 and control of transferring of the solid-state image pickup element 101 are shown in Table 1 in the same way as the first embodiment.

By repeating operation shown in Table 1 in the same way, vertical enlargement is performed only by the line memories 5, 6 and 7 even in the image pickup element of X-Y address.

Horizontal enlargement is carried out by the similar procedure to the aforementioned embodiments. [Seventh Embodiment]

Figure 15:
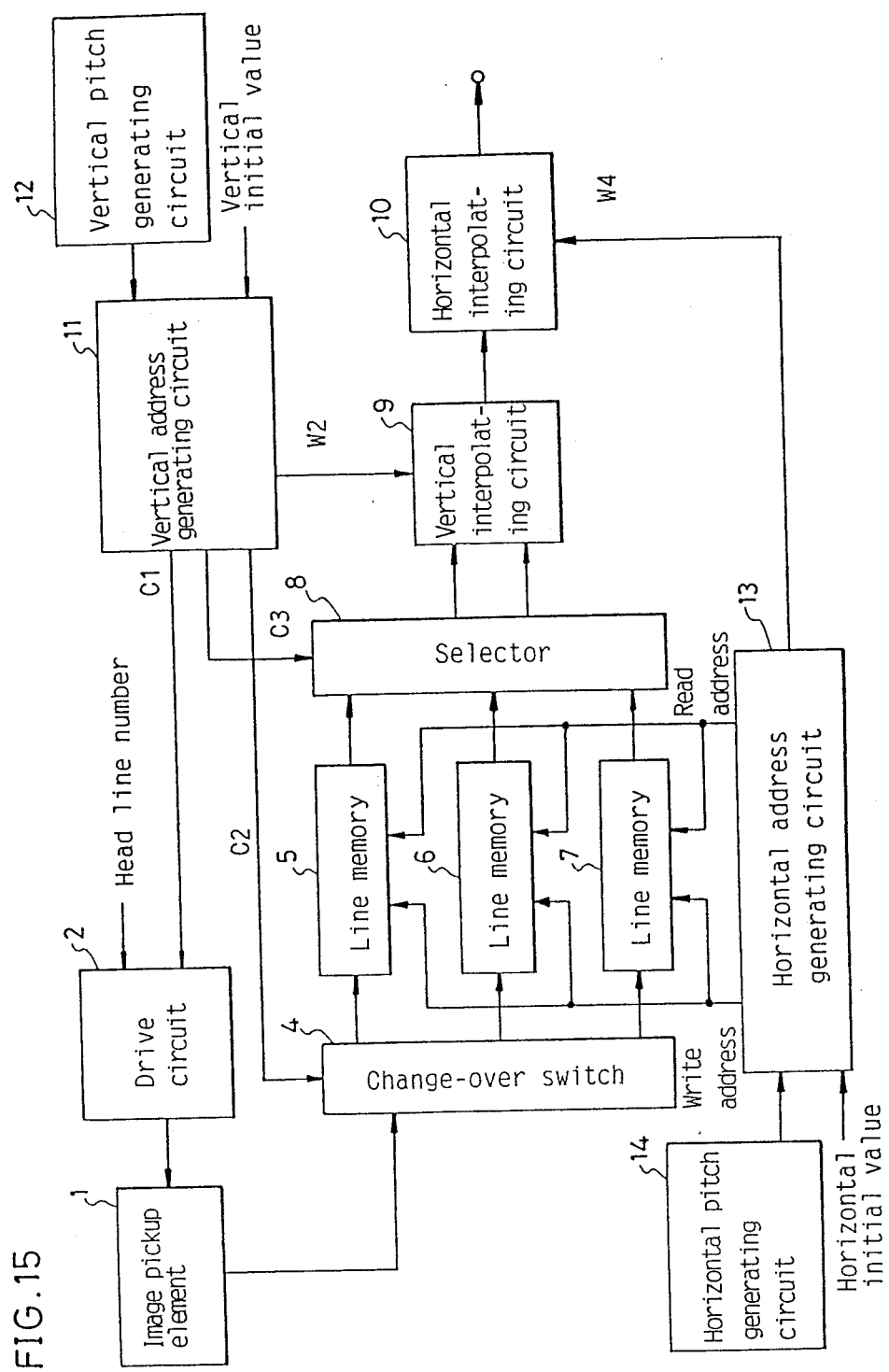
FIG. 15 is a block diagram showing the image pickup apparatus of a seventh embodiment of the present invention.

FIG. 15 is a block diagram showing the image pickup apparatus of a seventh embodiment.

The following description is based upon a case such that a CCD type image pickup element, which has a vertical transferring part comprising a construction of shift register, is employed as a solid-state image pickup element 1. A drive circuit 2 controls to execute or stop vertical-tranferring of the solid-state impage pickup element 1 in accordance with a control signal C1. Output signal of the solid-state image pickup element 1 is selectively given to line memories 5, 6 and 7 through a change-over switch 4 in response to control signal C2. A selector 8 selects two of the line memories and issues data in response to a control signal C3. Output signal of the selector 8 is sent to a vertical interpolating circuit 8 and a horizontal interpolating circuit 10. A vertical address generating circuit 11 receives a vertical initial value and a vertical pitch signal given from the vertical pitch generating circuit 12 at every line as input signals. The vertical address generating circuit 11 generates the control signal C1 for controlling vertical transfering of the solid-state image pickup element 1, the control signals C2 and C3 for respectively controlling the change-over switch 4 and the selector 8, and a weight signal W2 for the vertical interpolating circuit 9. A horizontal address generating circuit 13 receives a horizontal initial value and a horizontal pitch signal given from the horizontal pitch generating circuit 14 at every picture element as input signals. The horizontal address generating circuit 13 generates write address and read address for the line memories 5, 6 and 7 and weight signal W24 for the horizontal interpolating circuit 10. The vertical address generating circuit 11 and the horizontal address generating circuit 13 constitute a control signal generating circuit.

Figure 16:
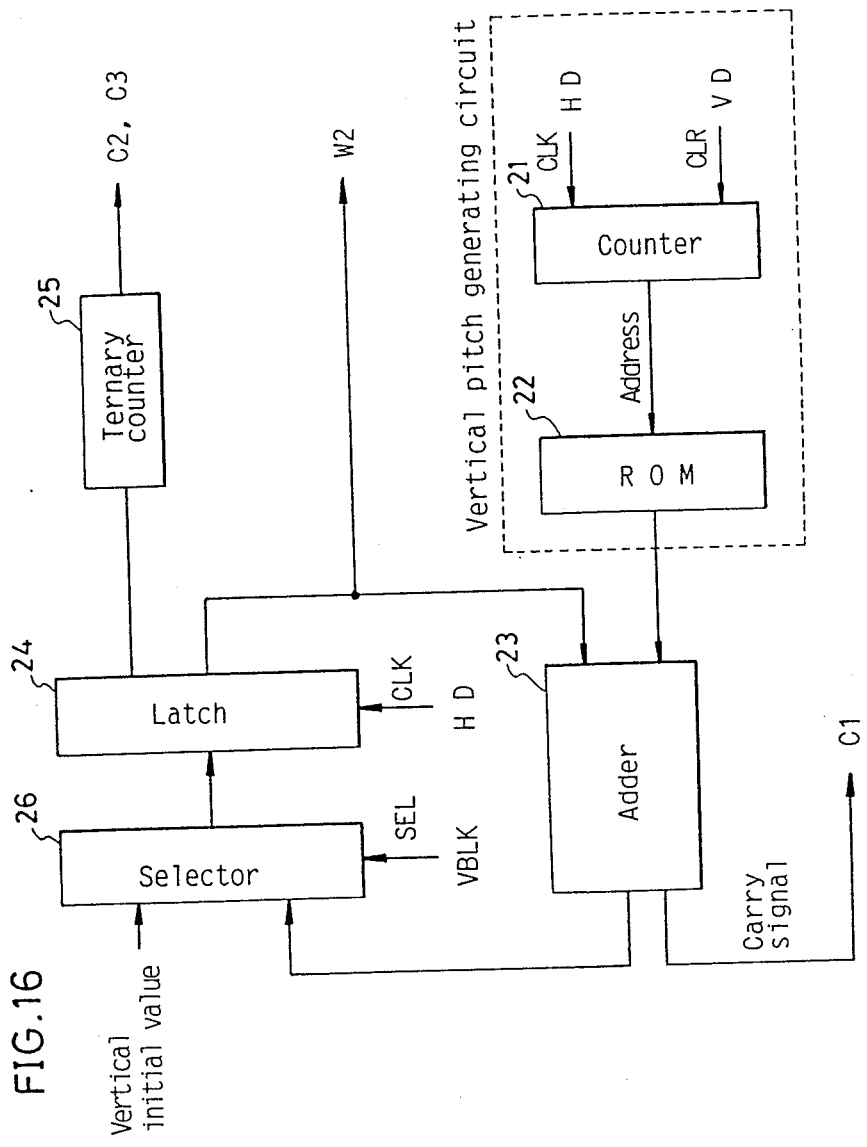
FIG. 16 is a block diagram showing a vertical pitch generating circuit and a vertical address generating circuit of the seventh embodiment.

FIG. 16 is block diagram showing the vertical pitch generating circuit 12 and the vertical address generating circuit 11. A counter 21 counts up at every line and is reset during a time period of vertical blanking. Output of the counter 21 is supplied to a ROM 22 as address signals. Data of vertical pitches are stored in the ROM 22 in correspondence with each line of the picture, and the data of vertical pitches are issued in response to the address signal. Initial value is set in an adder 23 by a selector 26 during the time period of vertical blanking, and thereafter vertical pitch signal, which is supplied from the ROM 22, is added at every line. Decimal processed in the adder 23 is issued through a latch 24 as a weight signal W2 for the vertical interpolating circuit 8. Carry signal of the adder 23 is issued as a control signal C1 and sent to a ternary counter 25. The lowest two bits of number processed in the ternary counter 25 are issued as control signals C2 and C3.

Figure 17:
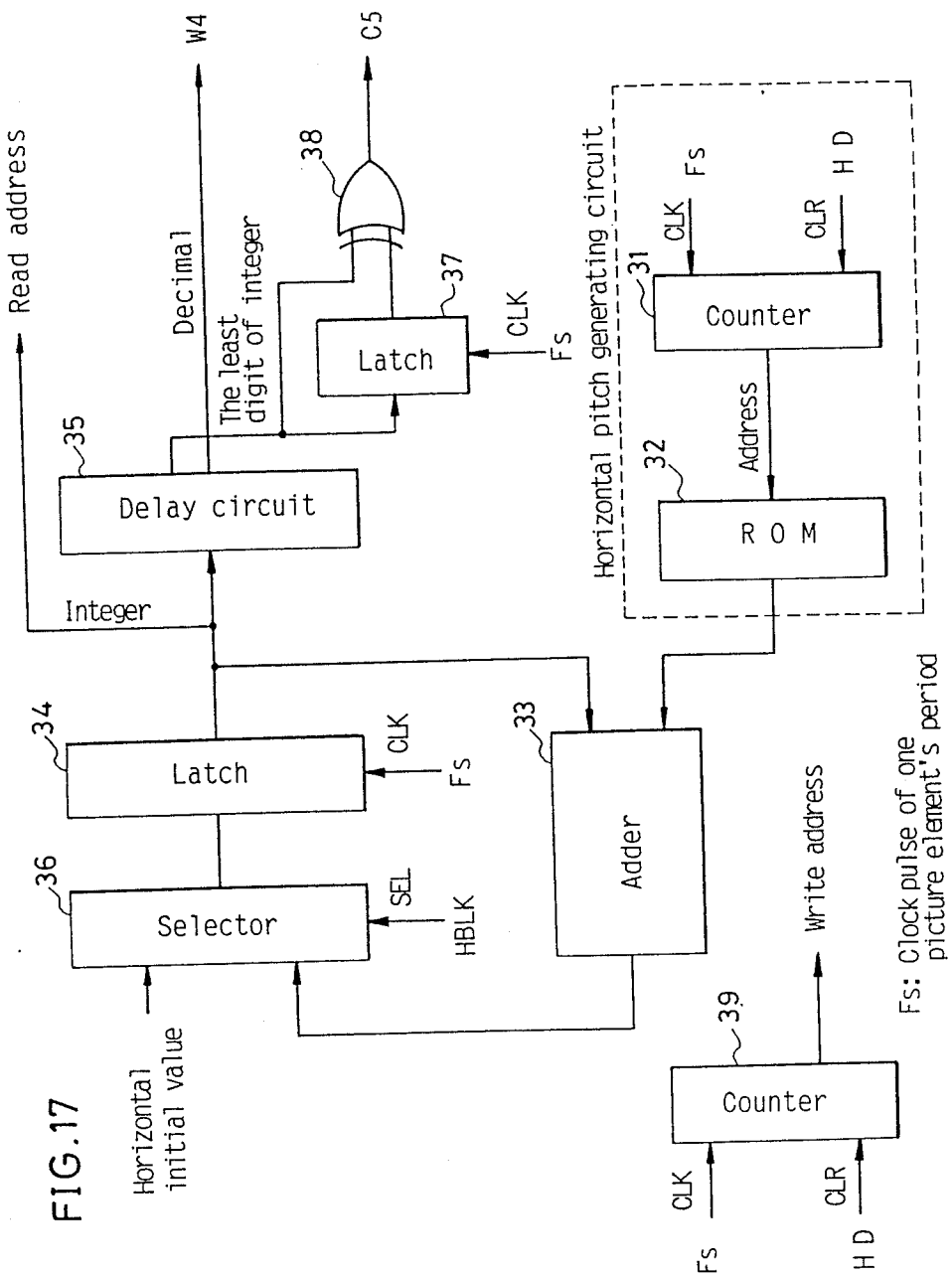
FIG. 17 is a block diagram showing a horizontal pitch generating circuit and a horizontal address generating circuit of the seventh embodiment.

FIG. 17 is a block diagram showing the horizontal pitch generating circuit 14 and the horizontal address generating circuit 13. A counter 31 counts up at every picture element and is reset during a time period of horizontal blanking. Output of the counter 31 is supplied to a ROM 32 as address signals. Horizontal pitches are stored in the ROM 32 in correspondence with each picture element on the scanning line of the picture, and the horizontal pitches are issued in response to the address signal. Initial value is set in an adder 33 by a selector 36 during the time period of horizontal blanking, and thereafter horizontal pitch signal, which is supplied from the ROM 32, is added at every picture element. Integer processed in the adder 33 is issued through the latch 34 as read address signals for the line memories 5, 6 and 7, and decimal processed in the adder 33 is issued through a delay circuit 35 as the weight signal W4 for the horizontal interpolating circuit 10. The lowest bit of the integer is inputted to an exclusive OR gate 38 together with signal passed through a latch 37, thereby issuing a control signal C5 to the horizontal interpolating circuit 10. A counter 39 has the similar function to that of the counter 31 and generates write addresses for the line memories 5, 6 and 7.

Next, operation of the above-mentioned image pickup apparatus is described with reference to FIG. 6(a). FIG. 6(b) and FIGS. 15-17. For instance, proportional enlargement of 4/3 times in the vertical direction is shown. A pitch of 0.75 is given to all address of the ROM 22 shown in FIG. 16 in response to the magnification. In the line memories 5, 6 and 7, data of scanning lines [2], [3] and [4], which are issued from the solid-state image pickup element 1, are stored respectively. Firstly, interpolation of a scanning line D is described. Decimal of data which means vertical position of the scanning line D is held by the latch 24. To interpolate the scanning line D, a pair of scanning lines [3] and [4], which are upper line and lower line across the scanning line D, are utilized. The selector 8 operates to issue signal of the line memory 6 and signal of the line memory 7 to the multiplier 42 of the vertical interpolating circuit 9 and the multiplier 41 thereof, respectively. If decimal value of the vertical address of the scanning line D, which is held by the latch 24, is 0.25, value of W1 is set to be 0.75 and value of W2 is 0.25, in the vertical interpolating circuit 9. The multipliers 41 and 42 multiply weights on the scanning lines [3] and [4], respectively, and the weighted signals are added each other in the adder 44, thereby outputting interpolated signals of the scanning line D. At that time, adding of the next address is executed, and the output value 0.75 of the ROM 22 is added to the output 0.25 of the latch 24. Since sum is 1.00 (0.75+0.25), a carry signal C1 becomes 1, and this signal C1 is supplied to the drive circuit 2. Decimal 0.00 is written to the latch 24 by a next horizontal pulse HD. When the carry signal C1 becomes 1, the drive circuit 2 operates to vertically transfer the solid-state image pickup element 1, and a new signal of the scanning line [5] is issued from the solid-state image pickup element 1. A signal of the scanning line [2] stored in the line memory 5 is the oldest one among the signals of the scanning lines [2], [3] and [4]. After the scanning of the line D, it has already been unnecessary for interpolation. Therefore, the change-over switch 4 selects the line memory 5 and operates to write the signal of the scanning line [5] issued from the solid-state image pickup element 1. Both the writing to the line memory and the reading from that, that is, reading of the scanning lines [3] and [4] and writing of the scanning line [5], are simultaneously executed.

Next, interpolating of the scanning line E is described. Since the data held by the latch 24 is 0.00, the signal of the scanning line [4] can be used as that of the scanning line E. At this time, the weight signal W1 supplied to the multiplier 42 is 1, and the weight signal W2 supplied to the multiplier 41 is zero, thereby operating to supply the multiplier 42 and 41 with signals of the scanning line [4] [5], respectively. That is, the selector 8 issues the signal of the line memory 7 to the multiplier 42 and the signal of the line memory 5 to the multiplier 41. The signal of the scanning line [4], namely the scanning line E is therefore issued from the adder 44. At that time, adding of the next address is executed in the adder 23, and the output value 0.75 of the ROM 22 is added to the output 0.00 of the latch 24. Since sum is 0.75 (0.75+0.00), the carry signal C1 becomes zero, and this signal C1 is supplied to the drive circuit 2. Decimal 0.75 is written to the latch 24 by the next horizontal pulse HD. When the carry signal C1 becomes zero, the drive circuit 2 does not operate to vertically transfer the solid-state image pickup element 1, and nothing is issued from the solid-state image pickup element 1, and nothing is issued fromt the solid-state image pickup element 1. Therefore, each of the line memories stores the present data.

The above-mentioned selection of reading/writing of the line memories 5, 6 and 7 and control of transferring of the solid-state image pickup element 1 are shown in Table 1 in the same way as the first embodiment.

By repeating the operation shown in Table 1 in the same way, vertical enlargement is performed only by the line memories 5, 6 and 7.

Next, an example for horizontal enlargement is described. Outputs from the horizontal address generating circuit shown by FIG. 3 are used as read addresses for the line memories 5, 6 and 7. Output signal from the vertical interpolating circuit 9 is supplied to the horizontal interpolating circuit shown by FIG. 5. Interpolation between two picture elements in the horizontal direction is executed by using the horizontal weight signal W4 generated by the horizontal address generating circuit shown by FIG. 3. This operation is very similar to that of vertical direction. By the latch 37 and the exclusive OR gate 38, change of the read address is detected. When the change is detected, the control signal C5 becomes 1, and the next picture element's signals are taken into the latches 51 and 52 of the horizonal interpolating circuit 10. Other operation is the same as that of the vertical enlargement.

Figure 18:
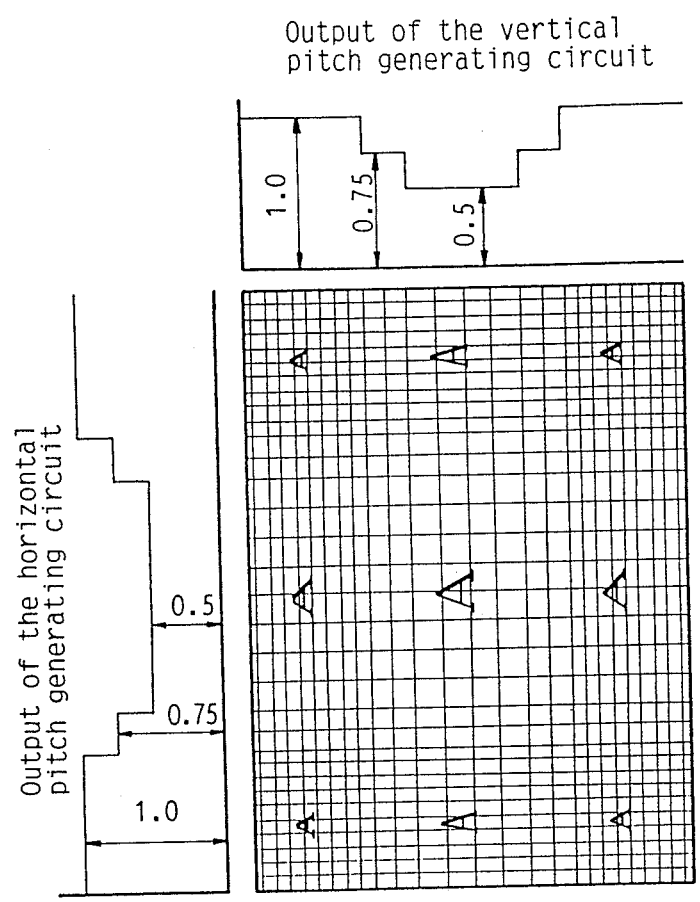
FIG. 18 is a graph showing an example of partially enlarged image and data of ROM 22 and ROM 23.
Figure 19:
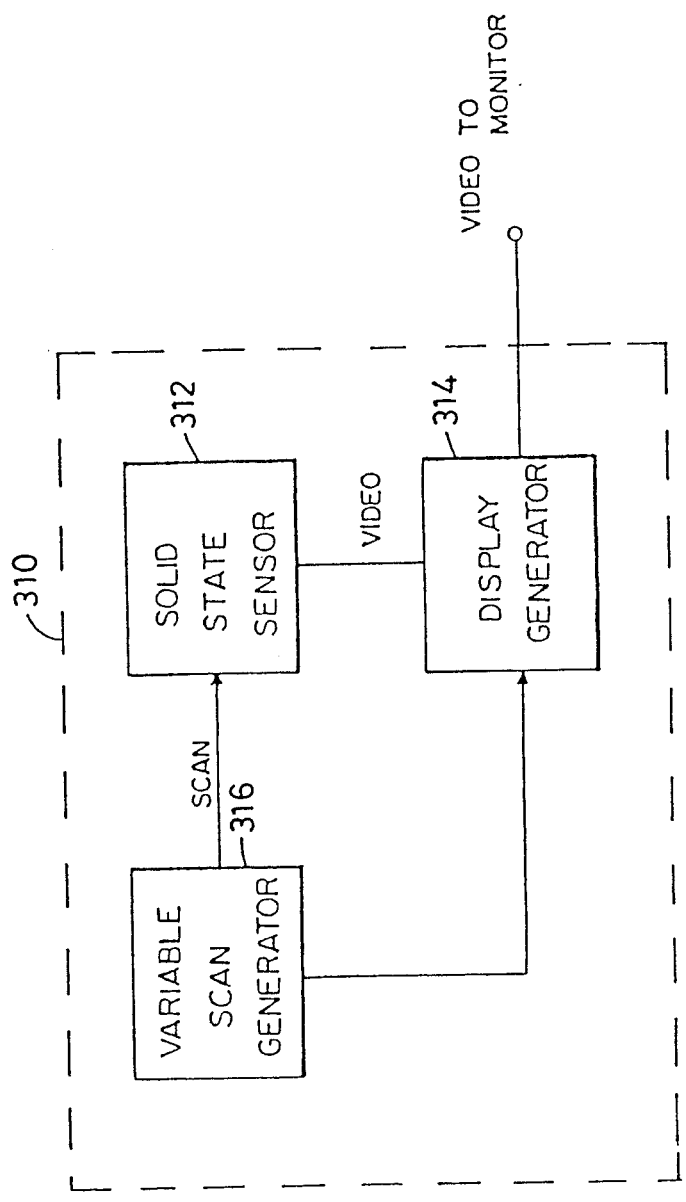
FIG. 19 is the block diagram showing the conventional image pickup apparatus.
Figure 20:
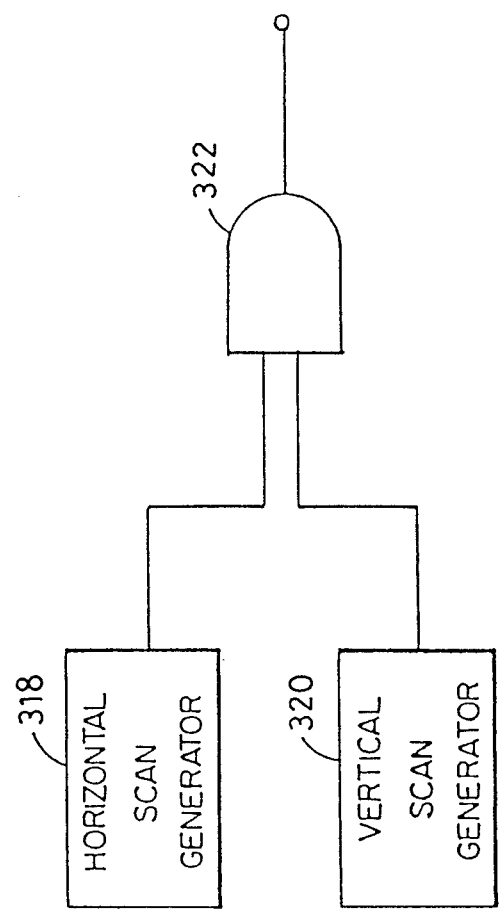
FIG. 20 is the block diagram showing the variable scan generator of the conventional image pickup apparatus.
Figure 21:
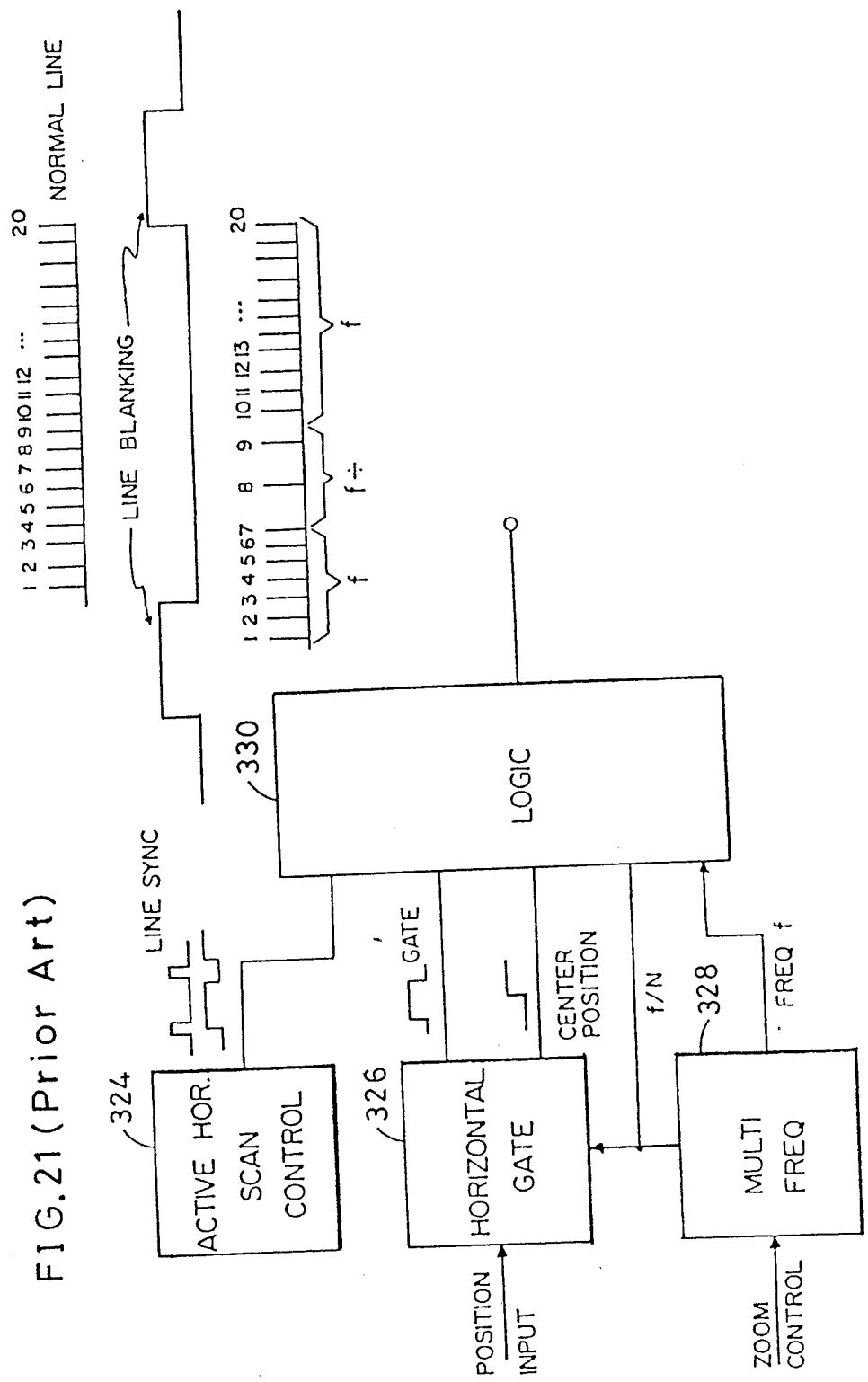
FIG. 21 is the block diagram showing the horizontal scan generator of the conventional image pickup apparatus.
Figure 22:
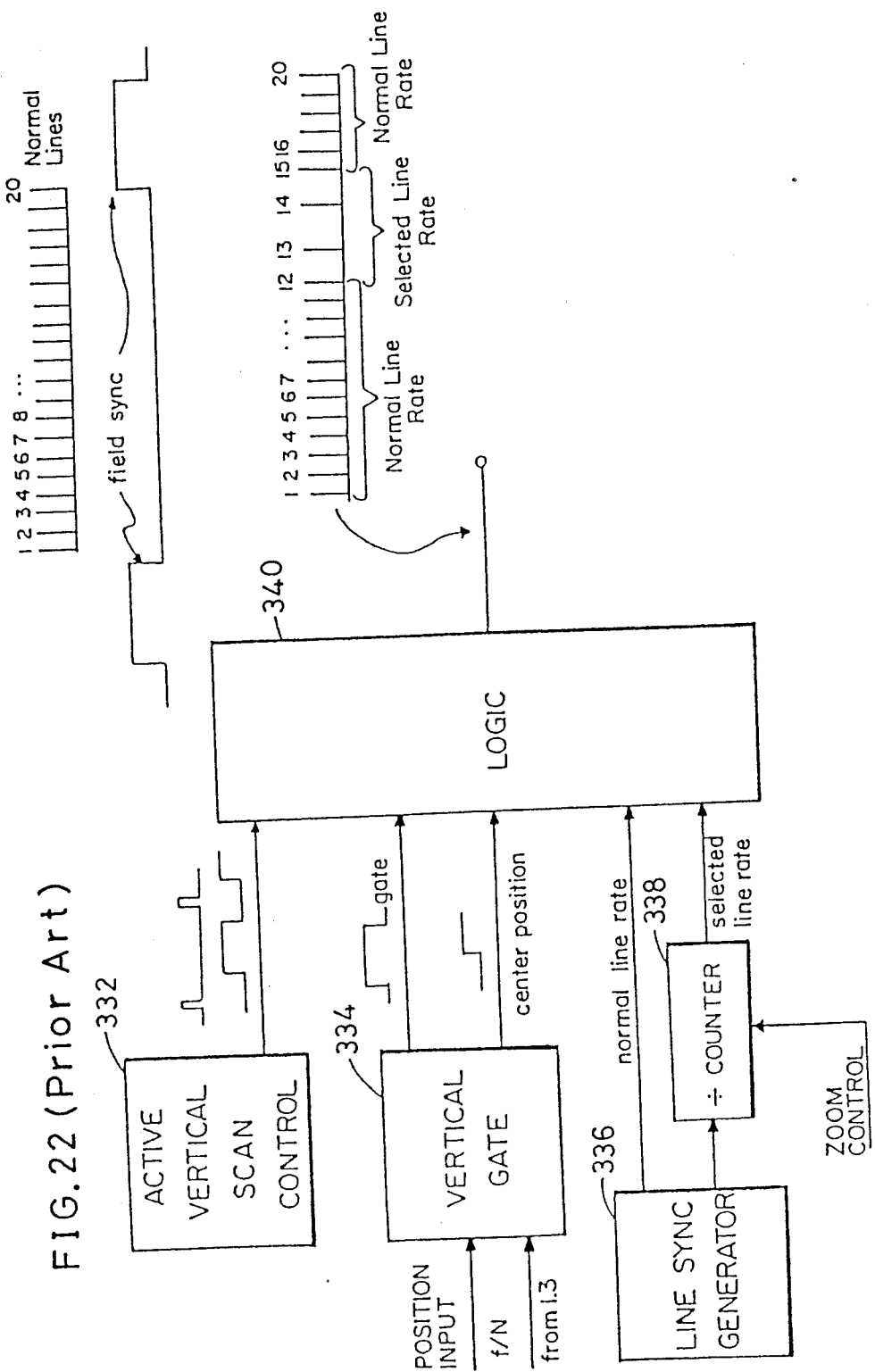
FIG. 22 is the block diagram showing the vertical scan generator of the conventional image pickup apparatus.
Figure 23:
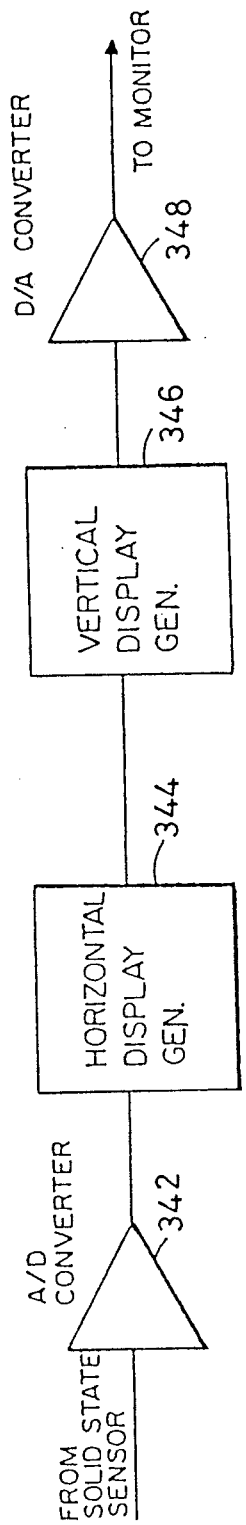
FIG. 23 is the block diagram showing the display generator of th conventional image pickup apparatus.
Figure 24:
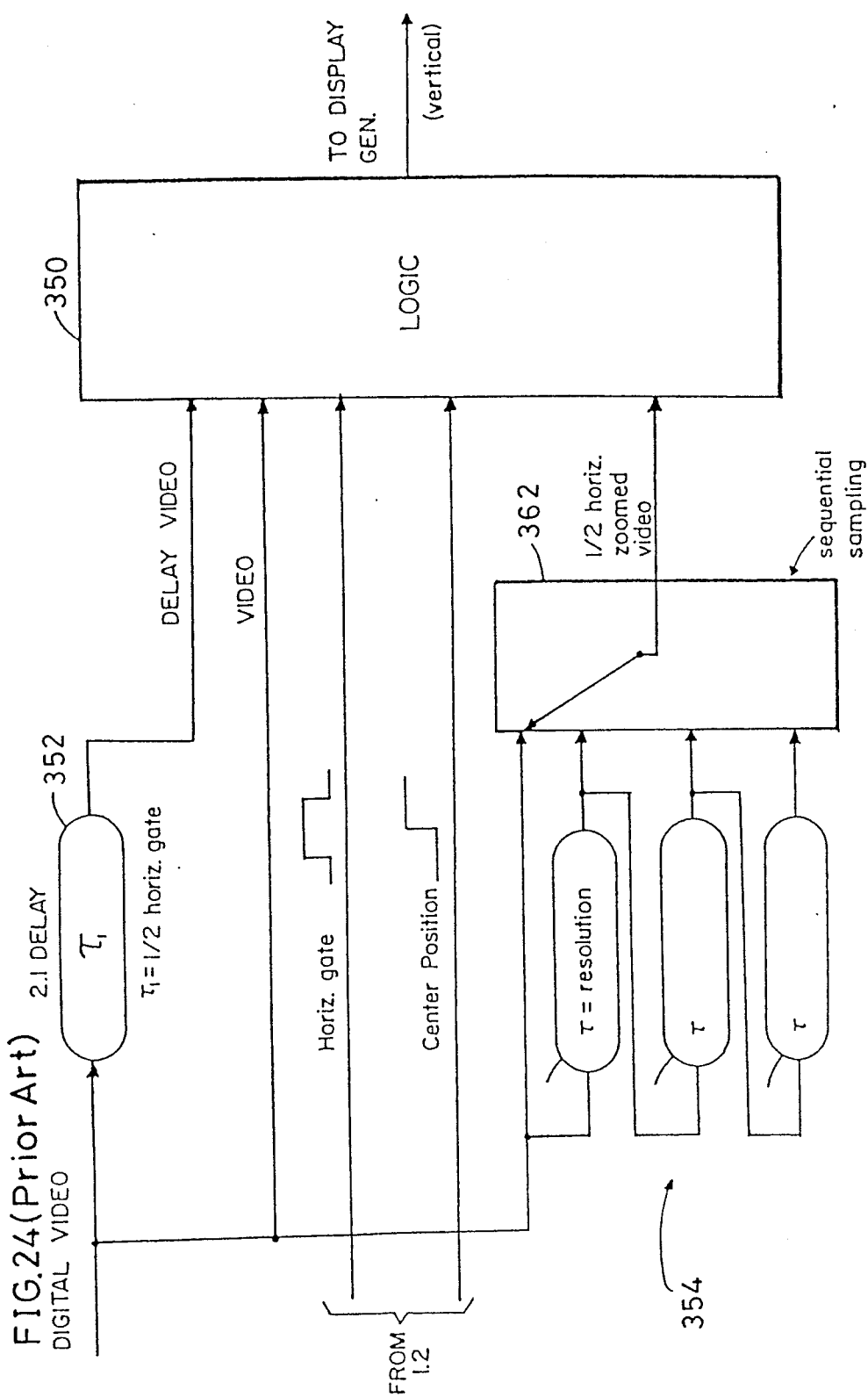
FIG. 24 is the block diagram showing the horizontal display generator of the conventional image pickup apparatus.
Figure 25:
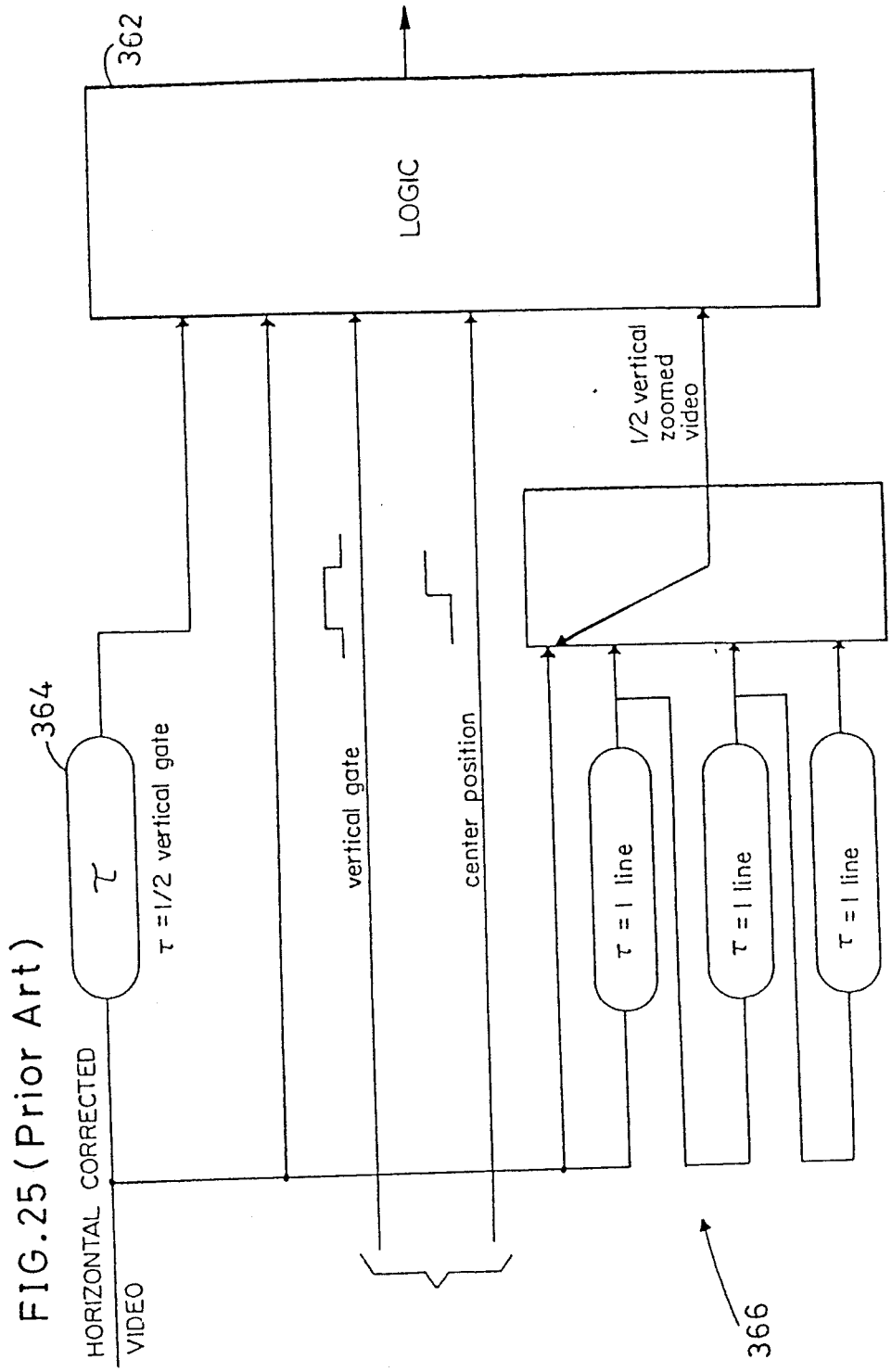
FIG. 25 is the block diagram showing the vertical display generator of the conventional image pickup apparatus.

Although the above-mentioned description is made on the basis that stored data of the ROM 22 and 32 are constant, other data can be stored. For instance, in a case that pitch data as shown in FIG. 18 are stored in the ROM 22 and the ROM 32, a part of the picture can be partially enlarged as shown in FIG. 18 by issuing corresponding pitch signals to every lines by the ROM 22 and every picture elements by the ROM 32. By changing data of the ROM 22 and the ROM 23, reform of the picture is freely executed.

Also, the ROM, which is used for the vertical/horizontal pitch generating circuit, can be replaced by a RAM etc. When the RAM is used, various reforming patterns can be easily realized by changing data stored therein. Of course, the vertical/horizontal pitch generating circuit can be constructed by many logical components.

As mentioned above, the image pickup apparatus of this embodiment can offer an electronic zoom image pickup apparatus which realizes special functions such as enlargement or reform of the picture by means of several line memories without lowering quality of the image.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An image pickup apparatus comprising:
   a solid-state image pickup element;
   a drive circuit which controls to execute and stop vertical scanning of said image pickup element in response to a control signal C1;
   n pieces of line memories (M1–Mn) for storing data of scanning lines;
   change-over means for selectively giving an output signal SO of said image pickup element to said line memories in response to a control signal C2;
   a selector for selecting output signals of m pieces of said line memories in response to a control signal C3;
   at least one multiplier for multiplying output signals S1—Sm of said selector by weight signals W1—Wm, respectively;
   an adder for adding output signals of said multiplier to each other; and
   a control signal generating circuit which issues said control signals C1, C2, C3 and W1-Wm and controls said change-over means to execute vertical transferring of said image pickup element, thereby to supply a new line's signal SON and write said new line's signal SON to a line memory Mx selected from among said line memories M1-Mn, wherein signal stored in said line memory Mx is the oldest one among signals stored in said line memories M1-Mn; wherein
   said n, m and x hold the relations:
   $n \geq 3,$
   $2 \leq m < n,$
   $1 \leq x \leq n,$
   wherein
   n, m and x are integers.

2. An image pickup apparatus in accordance with claim 1, further comprising:
   a processing circuit for generating luminance signal or chrominance/chrominance-difference signal, which are used as input signals of said change-over means, from said output signal S0.

3. An image pickup apparatus in accordance with claim 2, wherein
said processing circuit has a delay line whereto output signal is inputted again at the time when vertical transferring of said image pickup element stops and said signal SO is not issued.

4. An image pickup apparatus in accordance with claim 2, wherein
said processing circuit has a delay line, driving of which stops and holds present signal at the time when vertical transferring of said image pickup element stops and said signal SO is not issued.

5. An image pickup apparatus in accordance with claim 1, wherein
said image pickup element comprises a vertical transferring part constructed by a shift register.

6. An image pickup apparatus in accordance with claim 1, wherein
said image pickup element is of X-Y address type 7. An image pickup apparatus comprising:
a solid-state image pickup element;
a drive circuit which controls to execute and stop vertical scanning of said image pickup element in response to a control signal C1;
n pieces of line memories (M1-Mn) for storing data of scanning lines;
change-over means for selectively giving an output signal SO of said image pickup element to said line memories in response to a control signal C2;
a selector for selecting output signals of m pieces of said line memories in response to a control signal C3;
at least one multiplier for multiplying output signals S1-Sm of said selector by weight signals W1—Wm, respectively;
an adder for adding output signals of said multiplier to each other;
a pitch generating circuit for issuing pitch signals of a predetermined pattern, said pitch signals corresponding to each of scanning lines of a picture; and
a control signal generating circuit which issues said control signals C1, C2, C3 and W1-Wm and controls said change-over means to execute vertical transferring of said image pickup element, thereby to supply a new line's signal SON and write said new line's signal SON to a line memory Mx selected from among said line memories M1-Mn, wherein signal stored in said line memory Mx is the oldest one among signals stored in the line memories M1-Mn; wherein
said n, m and x hold the relations:

$$n \geq 3,$$
$$2 \leq m < n,$$
$$1 \leq x \leq n,$$

wherein
n, m and x are integers.

8. An image pickup apparatus comprising:
a solid-state image pickup element;
a drive circuit which controls to execute and stop vertical scanning of said image pickup element in response to a control signal C1;
n pieces of line memories (M1-Mn), for storing data of scanning lines;
change-over means for selectively giving an output signal SO of said image pickup element to said line memories in response to a control signal C2;
a selector for selecting output signals of m pieces of said line memories in response to a control signal C3;
at least one multiplier for multiplying output signals S1-Sm of said selector by weight signals W1-Wm, respectively;
an adder for adding output signals of said multiplier to each other;
a mircrocomputer for generating pitch signals in response to magnification signal which is predetermined and changes with lapse of time; and
a control signal generating circuit which issues said control signals C1, C2, C3 and W1-Wm and controls said change-over means to execute vertical transferring of said image pickup element, thereby to supply a new line's signal SON and write said new line's signal SON to a line memory Mx selected from among said line memories M1-Mn, wherein signal stored in said line memory Mx is the oldest one among signals stored in said line memories M1-Mn; wherein
said n, m and x hold the relations:

$$n \geq 3,$$
$$2 \leq m < n,$$
$$1 \leq x \leq n,$$

wherein
n, m and x are integers.

9. An image pickup apparatus comprising:
a solid-state image pickup element which has a vertical transferring part constructed by a shift register;
a drive circuit which controls to execute and stop vertical scanning of said image pickup element in response to a control signal C1;
a processing circuit for generating luminance signal or chrominance/chrominance-difference signal from an output signal SO of said image pickup element;
n pieces of line memories (M1-Mn) for storing data of scanning lines;
change-over means for selectively giving output signal of said processing circuit to said line memories in response to a control signal C2;
a selector for selecting output signal of m pieces of said line memories in response to a control signal C3;
at least one multiplier for multiplying output signals S1-Sm of said selector by weight signals W1—Wm, respectively;
an adder for adding output signals of said multiplier to each other;
a mircrocomputer for generating pitch signals in response to magnification signal which is predetermined and changes with lapse of time; and
a control signal generating circuit which issues said control signals C1, C2, C3 and W1-Wm and controls said change-over means to execute vertical transferring of said image pickup element, thereby to supply a new line's signal SON and write said new line's signal SON to a line memory Mx selected from among said line memories M1-Mn, wherein signal stored in said line memory Mx is the oldest one among signals stored in said line memories M1-Mn; wherein
said n, m and x hold the relations:

$$n \geq 3,$$
$$2 \leq m < n,$$
$$1 \leq x \leq n,$$

wherein
n, m and x are integers.

* * * * *